United States Patent [19]

Dangi et al.

[11] Patent Number: 5,231,492
[45] Date of Patent: Jul. 27, 1993

[54] VIDEO AND AUDIO MULTIPLEX TRANSMISSION SYSTEM

[75] Inventors: Ryoichi Dangi, Chiba; Takehiko Fujiyama; Toshiaki Usui, both of Kawasaki; Takashi Kawabata, Yokohama, all of Japan

[73] Assignee: Fujitsu Limited, Kawasaki, Japan

[21] Appl. No.: 613,546

[22] PCT Filed: Mar. 16, 1990

[86] PCT No.: PCT/JP90/00356
§ 371 Date: Nov. 16, 1990
§ 102(e) Date: Nov. 16, 1990

[87] PCT Pub. No.: WO90/10993
PCT Pub. Date: Sep. 20, 1990

[30] Foreign Application Priority Data

Mar. 16, 1989 [JP] Japan ................. 1-64597
Mar. 18, 1989 [JP] Japan ................. 1-66781
Mar. 18, 1989 [JP] Japan ................. 1-66782
Mar. 18, 1989 [JP] Japan ................. 1-66783
Jul. 11, 1989 [JP] Japan ................. 1-178454

[51] Int. Cl.[5] .................. H04N 7/04; H04N 7/14
[52] U.S. Cl. .................... 358/143; 358/85; 370/83
[58] Field of Search .......... 358/143, 144, 142, 85, 358/146, 13, 133, 135, 12, 86; 370/83, 95.1

[56] References Cited

U.S. PATENT DOCUMENTS 4,237,552 12/1980 Aikoh et al. ................. 370/83
4,630,257 12/1986 White .......................... 370/29
4,665,431 5/1987 Cooper ........................ 358/145
4,831,636 5/1989 Taniguchi et al. ............ 375/27

FOREIGN PATENT DOCUMENTS 61-159883 7/1986 Japan.
62-226781 10/1987 Japan.
63-15559 1/1988 Japan.
63-252083 10/1988 Japan.

Primary Examiner—James J. Groody
Assistant Examiner—Safet Metjahic
Attorney, Agent, or Firm—Staas & Halsey

[57] ABSTRACT

A system is disclosed for multiplexing, transmitting, and receiving picture data and sound data, wherein the picture data and sound data are balanced in a limited transmission capacity so as to obtain a better overall quality to effectively use the transmission ability of a medium. The content of at least one of the picture data and sound data are detected and used for control of the content of the transmission. The content of the transmission is controlled by changing data and sound to correct a difference between the processing speed of the picture data and the sound data, thereby improving the quality of a video conference system or the like where the transmission capacity is insufficient.

45 Claims, 44 Drawing Sheets

AN EMBODIMENT OF THE PRESENT INVENTION
(TRANSMITTING SIDE)

FRAME FORMAT

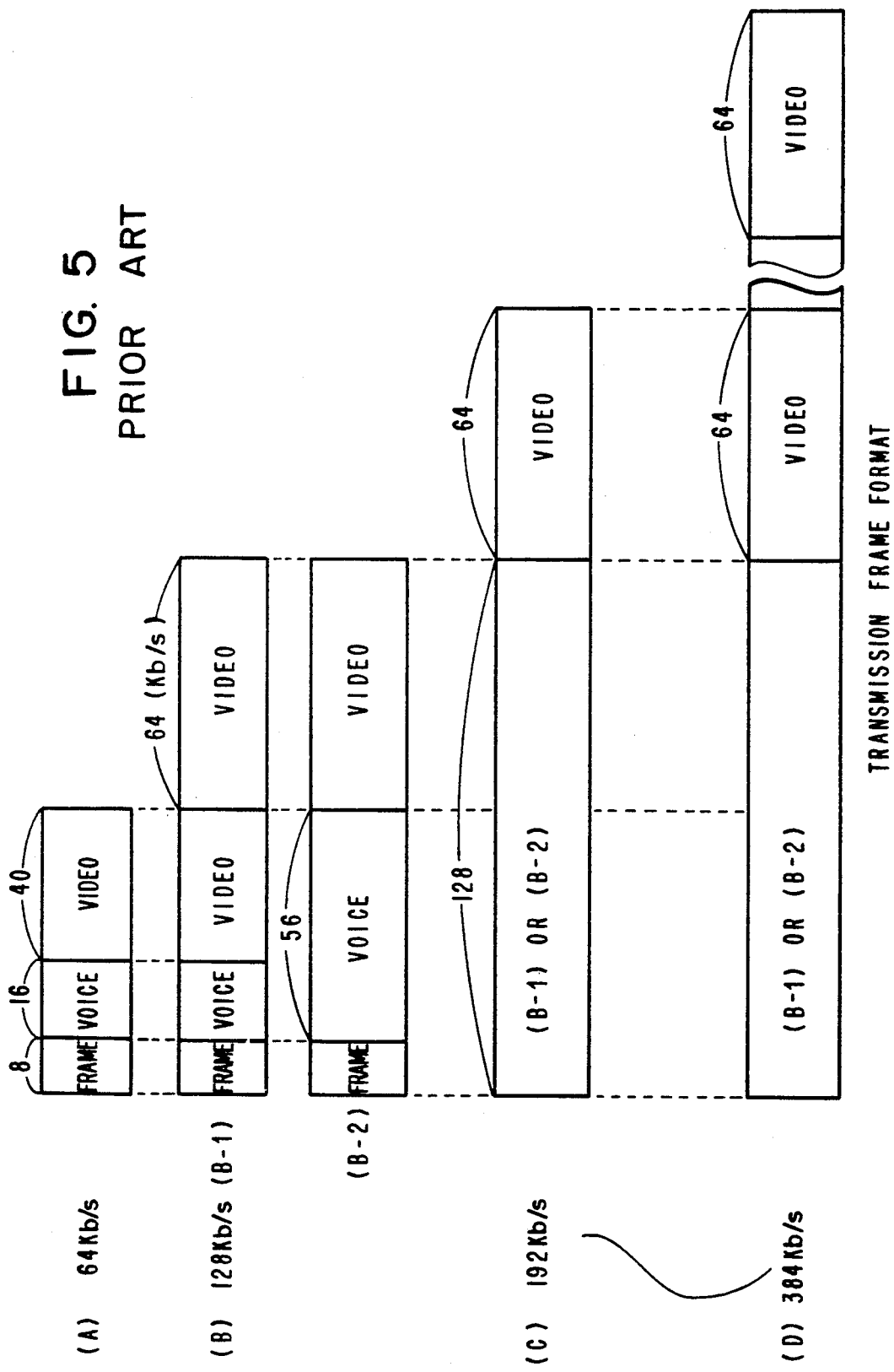

PRINCIPAL CONSTRUCTION DIAGRAM OF THE PRESENT INVENTION

AN EMBODIMENT OF THE PRESENT INVENTION
(TRANSMITTING SIDE)

a: FRAME HEADER
K: CODING BIT NUMBER
n: SAMPLING RATE (UNIT TIME) [n=8KHz]

VOICE FRAME·FORMAT

AN EMBODIMENT OF VOICE FRAMES

CONSTRUCTION OF MULTIPLEXING/DEMULTIPLEXING PART

Fig. 11(1)

| VOICE RATE | VIDEO RATE | AC RATE | ALLOCATION CODE (B1) | ALLOCATION CODE (B2) |
|---|---|---|---|---|
| 0 kb/s | 123.2 kb/s | 0 kb/s | 0101 0001 | 0101 0001 |
| 0 kb/s | 120.8 kb/s | 2.4 kb/s | 0101 1100 | 0101 0001 |
| 0 kb/s | 118.4 kb/s | 4.8 kb/s | 0101 0010 | 0101 0001 |
| 8 kb/s | 115.2 kb/s | 0 kb/s | 0101 0100 | 0101 0001 |
| 8 kb/s | 112.8 kb/s | 2.4 kb/s | 0100 0101 | 0101 0001 |
| 8 kb/s | 110.4 kb/s | 4.8 kb/s | 0101 0101 | 0101 0001 |
| 16 kb/s | 107.2 kb/s | 0 kb/s | 0101 0110 | 0101 0001 |
| 16 kb/s | 104.8 kb/s | 2.4 kb/s | 0101 1110 | 0101 0001 |
| 16 kb/s | 102.4 kb/s | 4.8 kb/s | 0101 0111 | 0101 0001 |
| 24 kb/s | 99.2 kb/s | 0 kb/s | 0000 0100 | 0101 0001 |
| 24 kb/s | 96.8 kb/s | 2.4 kb/s | 0000 1100 | 0101 0001 |
| 24 kb/s | 94.4 kb/s | 4.8 kb/s | 0001 1100 | 0101 0001 |

ALLOCATION OF BAS CODES

Fig. 11(2)

| VOICE RATE | VIDEO RATE | AC RATE | ALLOCATION CODE (B1) | ALLOCATION CODE (B2) |
|---|---|---|---|---|
| 32 kb/s | 91.2 kb/s | 0 kb/s | 0101 1000 | 0101 0001 |
| 32 kb/s | 88.8 kb/s | 2.4 kb/s | 0100 1001 | 0101 0001 |
| 32 kb/s | 86.4 kb/s | 4.8 kb/s | 0101 1001 | 0101 0001 |
| 40 kb/s | 83.2 kb/s | 0 kb/s | 0000 0010 | 0101 0001 |
| 40 kb/s | 80.8 kb/s | 2.4 kb/s | 0000 1010 | 0101 0001 |
| 40 kb/s | 78.4 kb/s | 4.8 kb/s | 0001 1010 | 0101 0001 |
| 48 kb/s | 75.2 kb/s | 0 kb/s | 0000 0001 | 0101 0001 |
| 48 kb/s | 72.8 kb/s | 2.4 kb/s | 0000 1001 | 0101 0001 |
| 48 kb/s | 70.4 kb/s | 4.8 kb/s | 0001 1001 | 0101 0001 |
| 56 kb/s | 67.2 kb/s | 0 kb/s | 0000 1000 | 0101 0001 |
| 56 kb/s | 64.8 kb/s | 2.4 kb/s | 0001 0000 | 0101 0001 |
| 56 kb/s | 62.4 kb/s | 4.8 kb/s | 0001 0001 | 0101 0001 |

ALLOCATION OF BAS CODES

SEPARATION BY BAS DATA

TRANSMISSION FRAME FORMAT (LONGITUDINAL DIRECTION)

AN EXAMPLE OF TRANSMISSION FRAME (0 BIT CODING)

AN EXAMPLE OF TRANSMISSION FRAME (1 BIT CODING)

AN EXAMPLE OF TRANSMISSION FRAME (3-BIT CODING)

AN EXAMPLE OF TRANSMISSION FRAME (7-BIT CODING)

Fig. 18
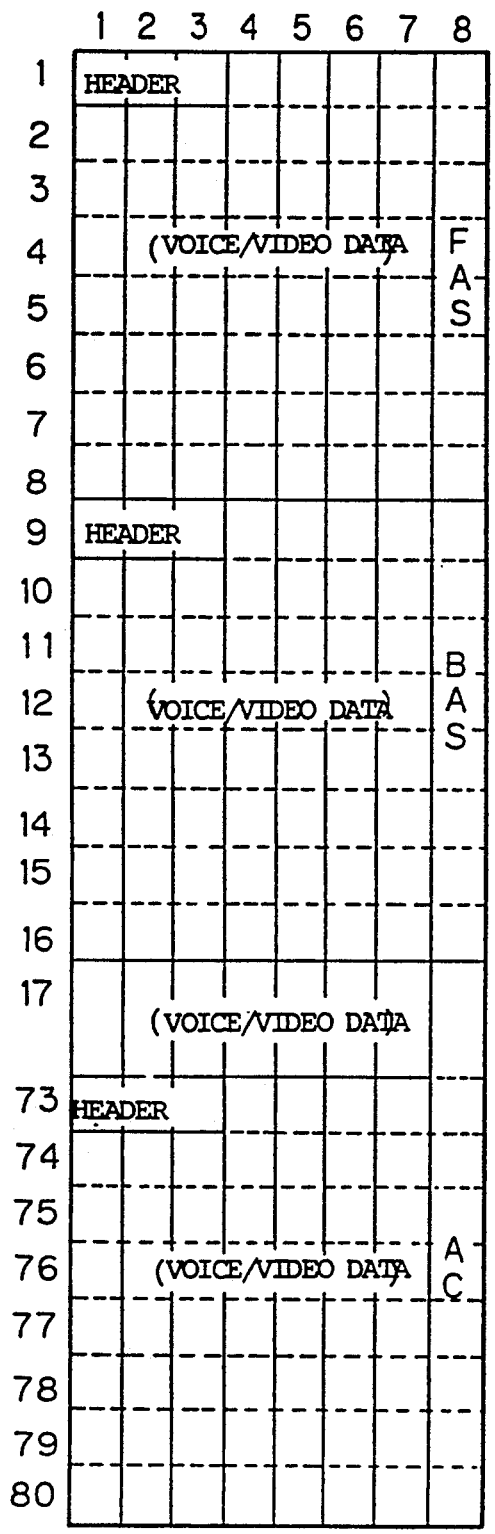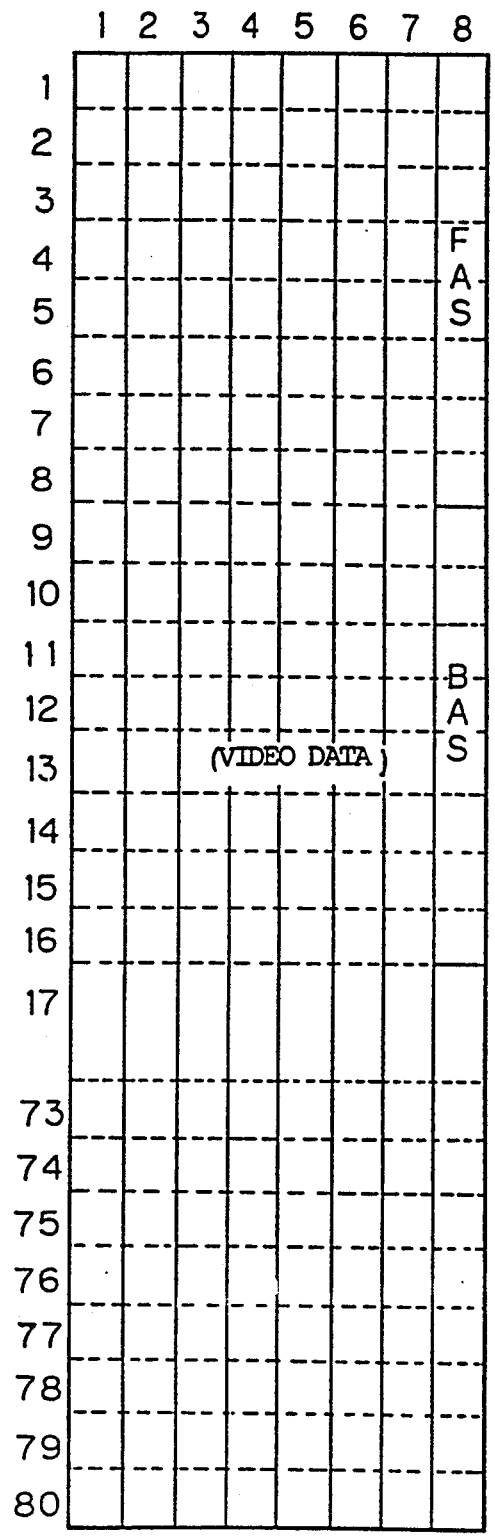
ANOTHER TRANSMISSION FRAME FORMAT

Fig. 19

AN EXAMPLE OF WRITING OF VOICE/VIDEO DATA
(TRANSVERSAL DIRECTION)

Fig. 20
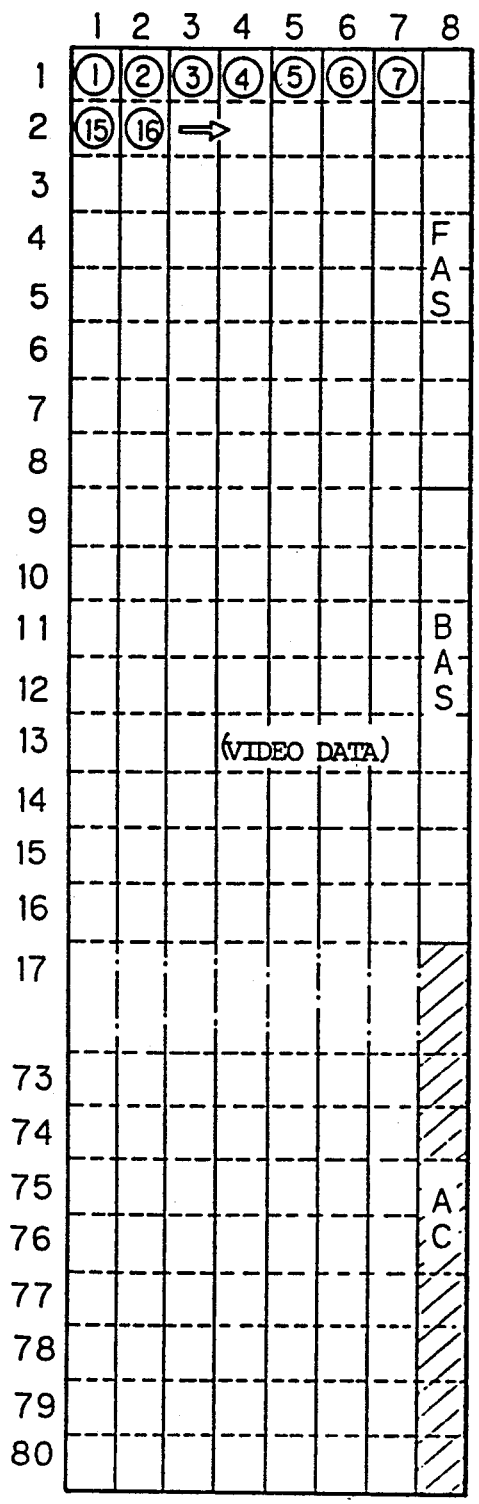
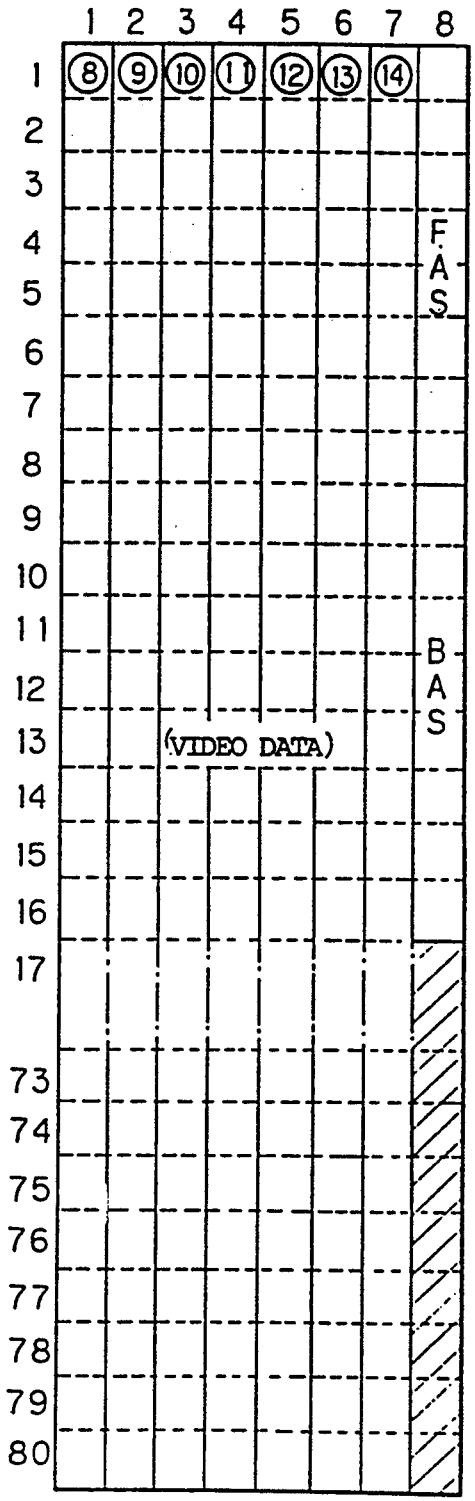
AN EXAMPLE OF TRANSMISSION FRAME (O-BIT CODING)

AN EXAMPLE OF TRANSMISSION FRAME (1-BIT CODING)

AN EXAMPLE OF TRANSMISSION FRAME (3-BIT CODING)

AN EXAMPLE OF TRANSMISSION FRAME (6-BIT CODING)

ANOTHER EMBODIMENT

ANOTHER EMBODIMENT OF
MULTIPLEXING/DEMULTIPLEXING PART

VOICE-VIDEO ALLOCATION CHANGE DIAGRAM

GENERAL DIAGRAM OF DATA TRANSMISSION

PRINCIPAL CONSTRUCTION DIAGRAM OF ANOTHER EMBODIMENT

EMBODIMENT OF THE INVENTION (TRANSMITTING SIDE)

VIDEO/VOICE BIT RATE DISCRIMINATING SEQUENCE

PRINCIPAL CONSTRUCTION DIAGRAM OF ANOTHER EMBODIMENT

DIAGRAM OF DISCRIMINATING AND CONTROLLING OF VOICE ALLOCATION RATE

| CONTINUOUS FRAMES | 1 | 2 | 3 | 4 | 5 | 6 | 7 | 8 |
|---|---|---|---|---|---|---|---|---|
| EVEN FRAMES | Mi | 0 | 0 | 1 | 1 | 0 | 1 | 1 |
|  |  |  |  | (FAW) |  |  |  |  |
| ODD FRAMES | Mi | 1 | A | 0 | 0 | 0 | 0 | 0 |

BIT ARRANGEMENT OF FAS DATA

Fig. 34

| VOICE RATE | VIDEO RATE | BAS CODE (B1) | BAS CODE (B2) |
|---|---|---|---|
| 48 kb/s | 75.2 kb/s | 0000 0001 | 0101 0001 |
| 48 kb/s | 75.8 kb/s | 0000 1001 | 0101 0001 |
| 48 kb/s | 70.4 kb/s | 0001 1001 | 0101 0001 |
| 56 kb/s | 67.2 kb/s | 0000 1000 | 0101 0001 |
| 56 kb/s | 64.8 kb/s | 0001 0000 | 0101 0001 |
| 56 kb/s | 62.4 kb/s | 0001 0001 | 0101 0001 |
| 64 kb/s | 75.2 kb/s | 0000 1000 | 0101 1001 |
| 64 kb/s | 72.8 kb/s | 0001 0000 | 0101 1001 |
| 64 kb/s | 70.4 kb/s | 0001 0001 | 0101 1001 |

BAS CODE ALLOCATION

Fig. 36
(a) BIT DECODING
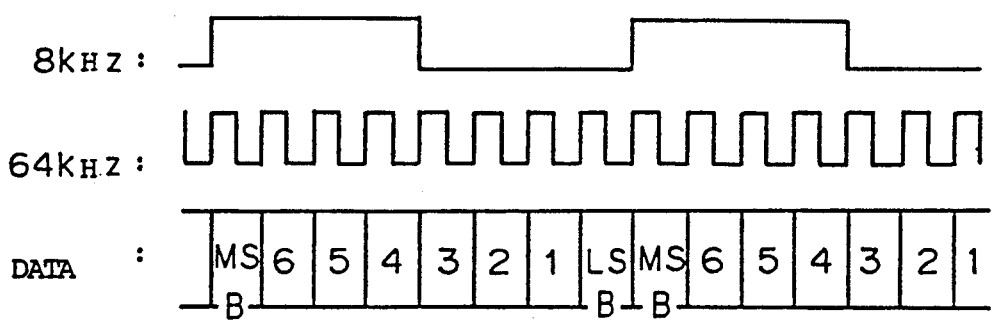
(b) BIT DECODING
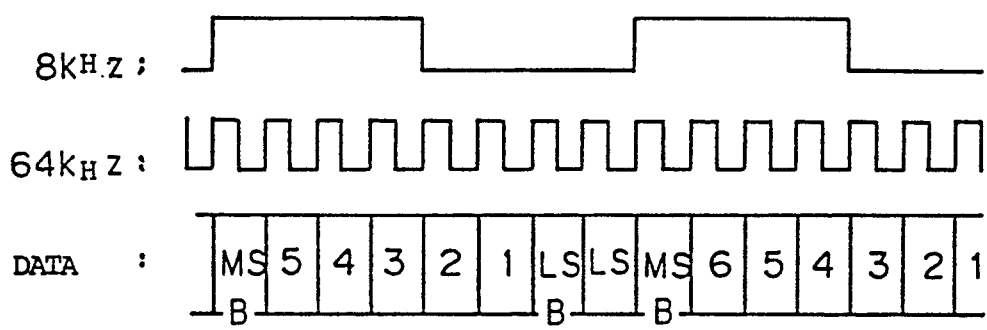
(c) BIT DECODING
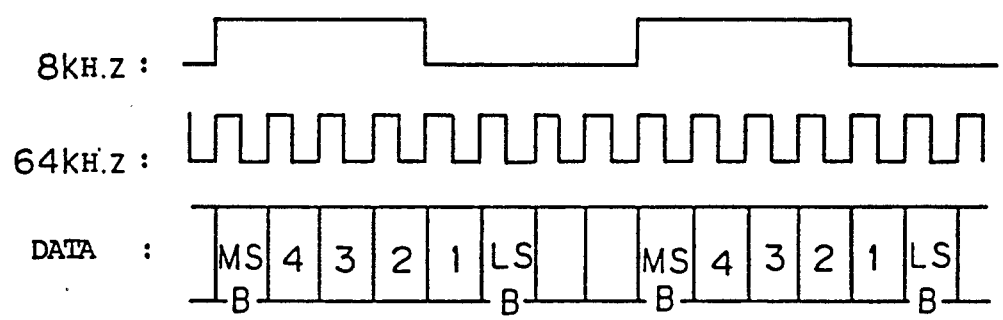
BIT ALLOCATION IN DECODING

IN-CHANNEL CONNECTION PROTOCOL

| ADDITIONAL DATA | 1 BIT | 2 BIT | 3 BIT | 4 BIT | 5 BIT | 6 BIT | 7-8 BIT |
|---|---|---|---|---|---|---|---|
| VOICE CODING METHOD | A-law | μ-law | SB-ADPCM | DPCM | APC-AB | ADPCM(K) | ....... |

EXAMPLES OF ADDITIONAL BITS

PRINCIPAL DIAGRAM OF ANOTHER EMBODIMENT

FRAME FORMAT

AN EMBODIMENT OF CALCULATION OF THE AMOUNT OF DELAY

CONSTRUCTION OF MULTIPLEXING/DEMULTIPLEXING PART

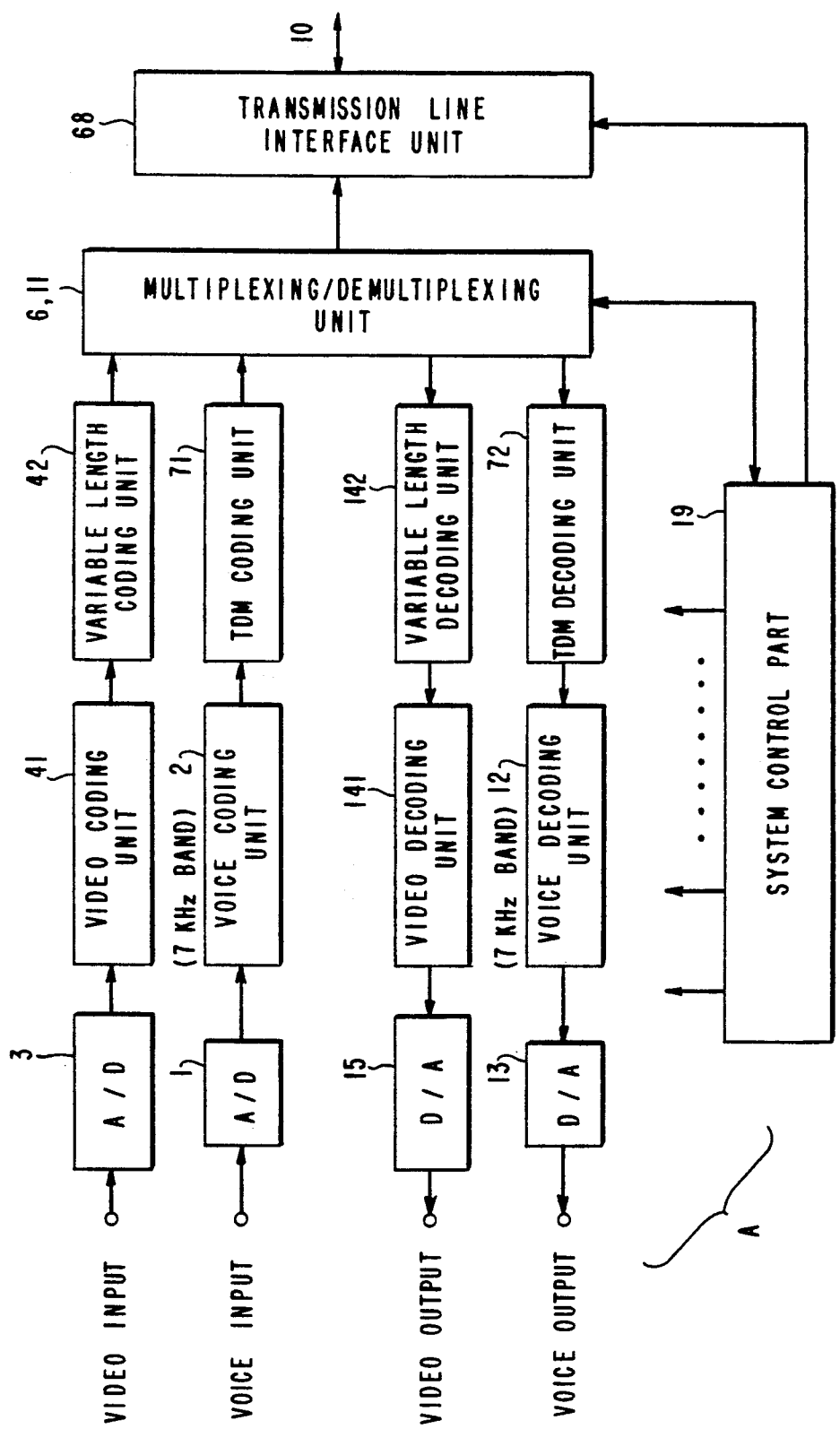
FIG. 44  PRINCIPAL CONSTRUCTION DIAGRAM OF ANOTHER EMBODIMENT

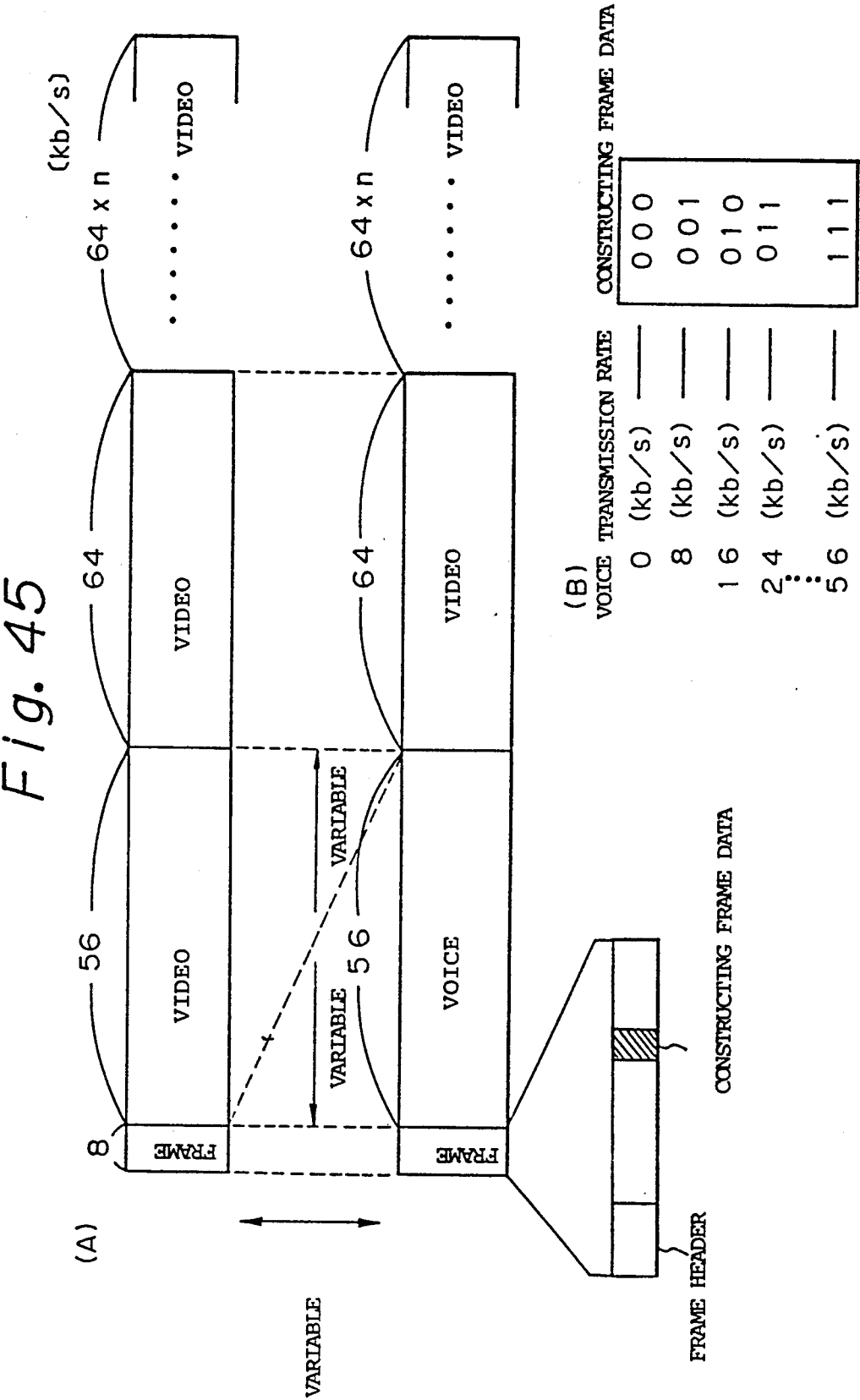

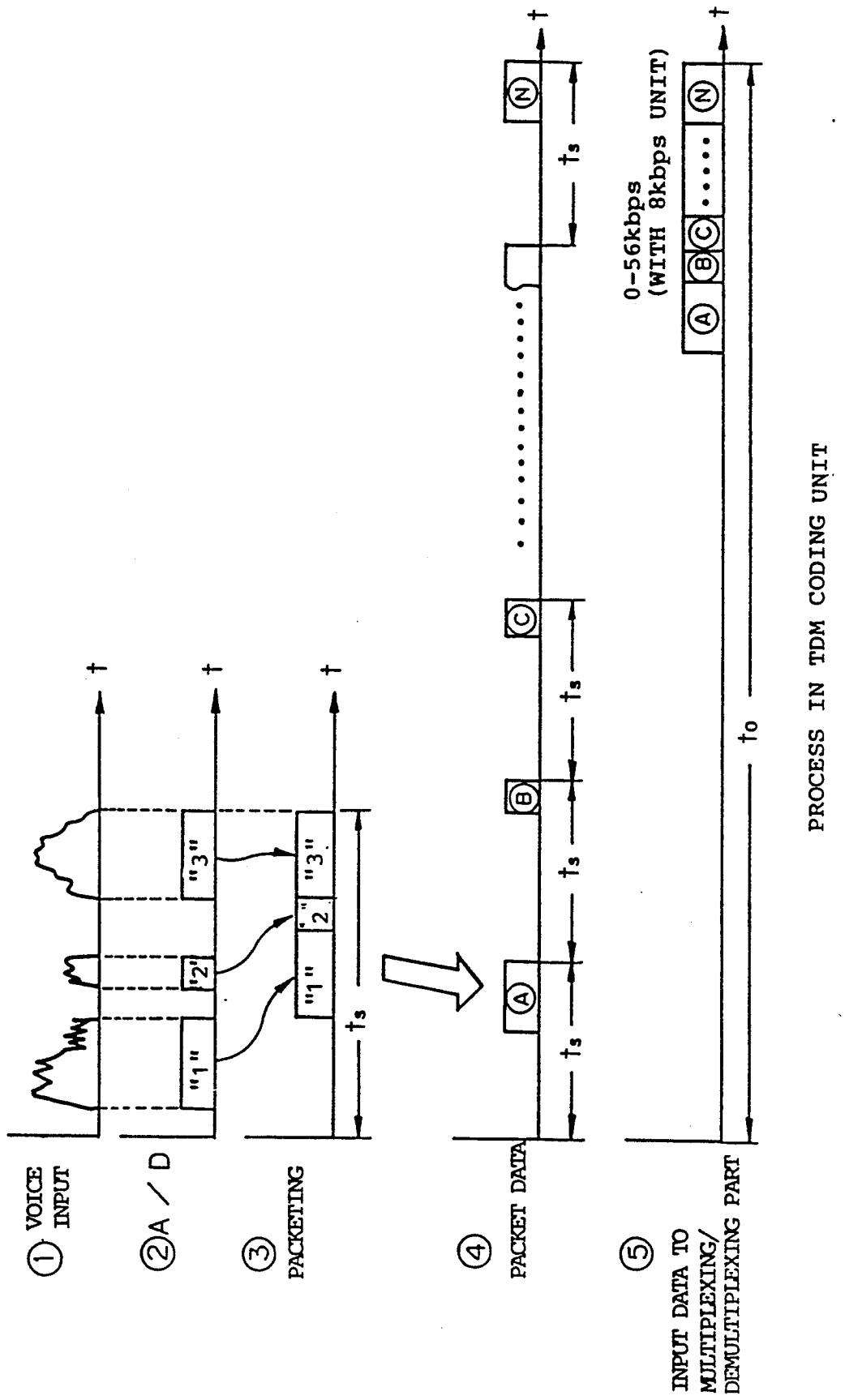

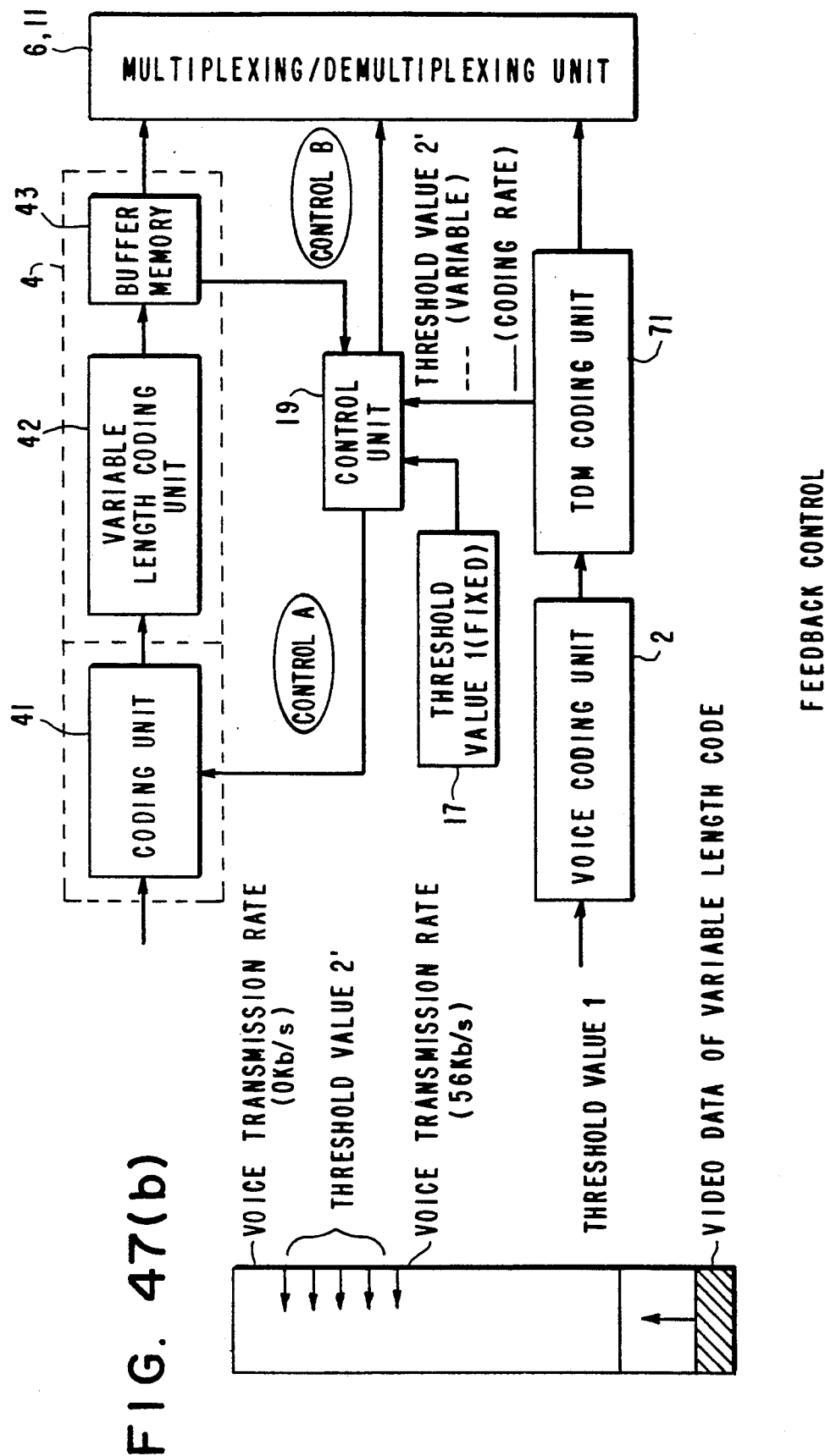

VIDEO AND AUDIO MULTIPLEX TRANSMISSION SYSTEM

BACKGROUND OF THE INVENTION

1. Technical Field

The present invention relates to a video and audio multiplex transmission system, more particularly relates to a system for coding audio data and video data and multiplexing and transmitting the same.

In recent years, there has been a boom in communications transmitting both audio data and video data, such as with video conferences and television-equipped telephones. In such a multiplex communications system, it is becoming important to performing the coding and decoding of the two at a high efficiency and to maintain a balance between the audio data and video data.

2. Description of the Related Art

In a video and audio coding system known in the past, which transmits coded audio data multiplexed with video coded data and other control data, in the case of a transmission speed of a particularly low bit rate such as in a 2×B system which uses two 64 kb/s lines, the 2B system which uses one 128 kb/s line, or the B system which uses one 64 kb/s line, the ratio of transmission between the audio and video signals is in general fixed to about 1:1 (for example, the case where the audio coding speed is 56 kb/s and the video coding speed is 64 kb/s), about 1:3 (for example, the case where the audio coding speed is 32 kb/s and the video coding speed is 96 kb/s), or about 1:7 (for example, the case where the audio coding speed is 16 kb/s and the video coding speed is 112 kb/s).

However, the ratio of the data density between the audio signal and video signal is inherently different by several hundred-fold. Despite this, the data is transmitted by the above ratios. Therefore, in the case of a transmission ratio of 1:1, the amount of video data transmitted per unit time becomes small, inviting deterioration of the quality of the reproduction of moving images. On the other hand, in the case of a transmission ratio of 1:7, the audio quality becomes poorer. In particular, in the latter case, when coding a picture with little movement, unnecessary bits (fill bits) are added for matching of the transmission bit rate so as to meet with the transmission capacity.

As mentioned above, in the conventional system, there has been the problem of a sacrifice of one of the video quality and audio quality.

In the video coding unit used in such a video and audio multiplexing system, the redundancy of the video data is reduced by interframe predictive coding, intraframe predictive coding, motion compensation predictive coding, variable word length coding, and other coding techniques, but the amount of data for video signals is far greater than for audio signals, so a delay occurs with respect to the coding and decoding processing times of audio signals.

Therefore, it was not possible to secure synchronization between the picture and sound at the receiving side (lip sync), and an unnatural reproduction with mismatched picture and sound resulted.

Therefore, the technique was used of finding in advance the average of the delay times of processing of video signals with respect to the sound and, based on this as a reference, causing a fixed delay time determined during the audio processing of the system. However, there was a problem in that the actual delay time changed depending on the content of the video data and therefore the unnaturalness could not be sufficiently improved.

Normally, also, the amount of the video data is far greater than that of the audio data, so not all of the video data is actually transmitted. That is, the portion which is not transmitted is ignored and the video data is sent with lapses. Due to this, the picture reproduced at the receiver side appears rough in movement. This is because picture quality is less important than real time transmission.

On the other hand, with respect to audio signals, there are silent periods in sound. Despite this, 16 kps/s worth or 56 kps/s worth of transmission capacity is secured. Therefore, it is desirable to use the silent periods in audio signals for the video signals.

SUMMARY OF THE INVENTION

The present invention has as its object to control the system as a whole, including video data processing and audio data processing, based on at least one of the transmitted video data and audio data, so as to maintain the optimal video quality and audio quality of the system as a whole.

First, this object is realized as follows according to one aspect of the present invention, i.e., a video and audio multiplex transmission system which is comprised of a transmission unit provided with an A/D converter for converting audio input to digital sound, an audio coding unit for coding said digital sound and outputting it as coded sound of a format enabling selection of the amount of transmission and outputting audio content data, an A/D converter for converting video input to a digital picture, a video coding unit for coding said digital picture and outputting the result as coded video data, a coding control unit for determining a transmission ratio of said coded sound and said coded picture in accordance with the amount of data of at least one of the said coded sound and said coded picture and outputting the result as an allocation signal, and a multiplexing unit for multiplexing said coded sound and said coded picture based on said allocation signal and further control data including said allocation signal so as to obtain a certain transmission frame length and a reception unit provided with a demultiplexing unit for receiving a multiplexed signal sent from the transmission unit to a transmission line and sent through the transmission line and for demultiplexing it to a coded sound, coded picture, and control data including an allocation signal, an audio decoding unit for decoding said coded sound to obtain a decoded digital sound, a video decoding unit for decoding said coded picture to obtain a decoded digital picture, a decoding control unit for performing control for said audio decoding unit and said video decoding unit based on said allocation signal, a D/A converter for converting said decoded digital sound to an audio signal, and a D/A converter for converting said decoded digital picture to a video signal, the transmission being performed by changing the transmission ratio of the sound and picture in accordance with the content of the transmission.

The audio data is smaller in amount than the video data, but decimations thereof etc. are not allowed. Therefore, the transmission ratio of the picture and sound was fixed and audio data of a certain quality was sent regardless of the content of the transmission.

In the present invention, the transmission ratio can be changed. Of course, for this, it is necessary to change the transmission ratio without interruption of the audio data. Therefore, adaptive type coding is performed for outputting the audio data as a plurality of coded sounds with different coding bit rates. The single most suitable coding bit rate is selected in accordance with the content of the transmission, so the audio quality does fluctuate, but the sound is never interrupted and transmission can be performed at the quality of the picture and sound most suited to the state at that time. Reproduction is performed at the receiving side in accordance with the coding bit rate.

Further, the plurality of coding bit rates are compared and the most suitable quality, that is, bit rate, is selected from the audio content.

Another adaptive type coder is an SB-ADPCM. This performs the coding dividing the data into a low region frequency part with a high data density and a high region frequency part with a low data density. The selection of the number of bits only causes a change in the sound quality.

In the case of this SB-ADPCM and a plurality of coding bit rates, the system as a whole can be made more balanced if one selects the number of bits giving consideration not only to the audio data, but also the video data and the state of the video buffer. As such video data, use is made of the rate of change of data among frames.

The video coding unit is designed to perform various types of processing for compressing the video data. Therefore, it is comprised of a video coding unit for coding and quantifying the digital picture, a variable length coding unit for coding in variable lengths the coded video data, a buffer in which this is stored temporarily before multiplexing, and a buffer judgment unit for showing the state of storage of this buffer. The video coding unit outputs a storage amount signal showing the state of buffer storage.

When the buffer becomes full, the video signal is decimated and time is taken until transmission.

To make the video and audio output match without deviation regardless of the content of transmission, there is provided a video and audio multiplex transmission system comprising a transmission unit provided with an A/D converter for converting audio input to digital sound, an audio coding unit for coding said digital sound, an A/D converter for converting video input to digital picture, a delay amount calculation unit for generating delay time data for synchronizing video reproduced output and audio reproduced output from input and output data of said video coding unit, and a multiplexing unit for multiplexing the coded video data and audio data and the delay time data, and a reception unit provided with a demultiplexing unit for demultiplexing a multiplexed signal from a transmission line into audio data, video data, and delay time data, a variable delay control unit for delaying the audio data in accordance with the delay time data, an audio decoding unit for decoding audio data from the variable delay control unit, a D/A converter for converting the decoded digital sound to an audio signal, a video decoding unit for decoding the coded picture, and a D/A converter for converting the decoded digital picture to a video signal.

To use the delay amount and eliminate the period of sound during the same less than a certain level, that is, the silent period, and transmit the audio portion all together, there is provided a video and audio multiplex transmission system which is provided, to deal with video signals, with a video coding unit for coding video signals and a variable length coding unit for variable length coding of the coded results, is provided, to deal with audio signals, with an audio signal coding unit, and is comprised so that the output from said variable length coding unit and the output corresponding to the said audio coding unit are transmitted multiplexed, the receiver side extracting the video signal and audio signal from what is transmitted, said video and audio multiplex transmission system being provided with a time division coding unit for extracting a signal during an effective period of sound and assembling it into a packet based on output from said audio coding unit, said time division coding unit is comprised so as to notify a system control unit of an audio transmission speed, said system control unit is comprised so as to receive said audio transmission speed and modify threshold data for controlling the coding amount of said video coding unit corresponding to the amount of data in a buffer memory in said variable length coding unit, and performing transmission in accordance with a frame format suited for said audio transmission speed.

BRIEF DESCRIPTION OF THE DRAWINGS

FIG. 5 shows the transmission frame format in the case of a different amount of transmission in the system shown in FIG. 3;

FIGS. 11(1) and 11(2) show examples of allocation of BAS codes and a table of codes;

FIG. 18 shows another example of a transmission frame format;

FIG. 19 shows a method of writing into the format of FIG. 18;

FIG. 20 to FIG. 23 show examples of the transmission frames when changing the number of bits of the audio data;

FIG. 34 shows an example of the allocation of BAS codes;

FIG. 36 is a view for explaining the decoding operation based on the allocation bits of the sound;

FIG. 44 shows the basic constitution of another embodiment;

FIG. 45 is an explanatory view of the transmission frame format of the system shown in FIG. 44;

FIG. 46 is an explanatory view of the processing in the time division coding unit; and FIGS. 47(a) and 47(b) are explanatory view of the feedback control.

DETAILED DESCRIPTION OF THE PREFERRED EMBODIMENTS

Before explaining the embodiments of the present invention, an explanation will be made of the conventional audio and video multiplex transmission system using FIG. 1 to FIG. 5 so as to facilitate understanding of the present invention.

Figure 1:
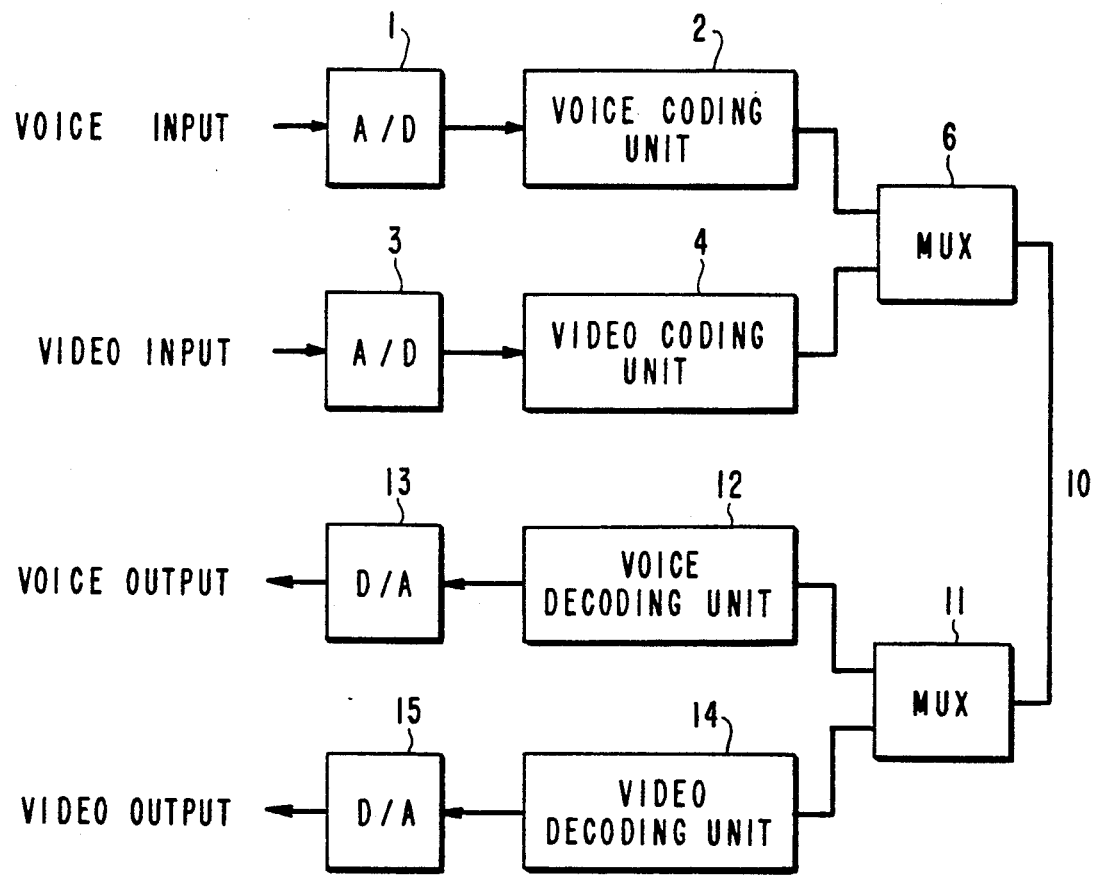
FIG. 1 shows a conventional example of a video and audio multiplex transmission system.

Note that throughout the figures, the same reference numerals are given to the same objects. FIG. 1 is a block diagram showing the constitution of a conventional video and audio multiplex transmission system and shows only the transmission unit and reception unit of the two terminal offices. As shown in the figure, the audio input is converted to digital sound by an A/D converter 1, then is coded by an audio coding unit 2 and input to a multiplexing unit 6. The video input is converted to a digital picture by an A/D converter 3, is quantified by the video coding unit 4, then is coded in variable lengths. The variable length coded video data is temporarily stored in a buffer and input to the multiplexing unit 6. The video coding unit 4 is comprised to have such a function. The coded sound and coded picture input to the multiplexing unit 6 are multiplexed at a certain ratio so as to give the transmission frame format shown in FIGS. 2(a) and 2(b), then is multiplexed with FAS, BAS, AC, and other control data and sent to a transmission line 10.

The multiplexed signal from the transmission line 10 is demultiplexed at a demultiplexing unit 11 into coded sound, coded picture, and control data. The demultiplexed coded sound is converted to digital sound by an audio decoding unit 12, then is further converted into an audio signal by a D/A converter 13 and then output. On the other hand, the demultiplexed coded picture is converted to a digital picture by a video decoding unit 14, then is converted into a video signal by a D/A converter 15 and output. The audio coding unit 2 and the audio decoding unit 12 are of corresponding types to enable a coded sound to be decoded to its original form. The same applies to the video coding unit 4 and video decoding unit 14.

Figure 3:
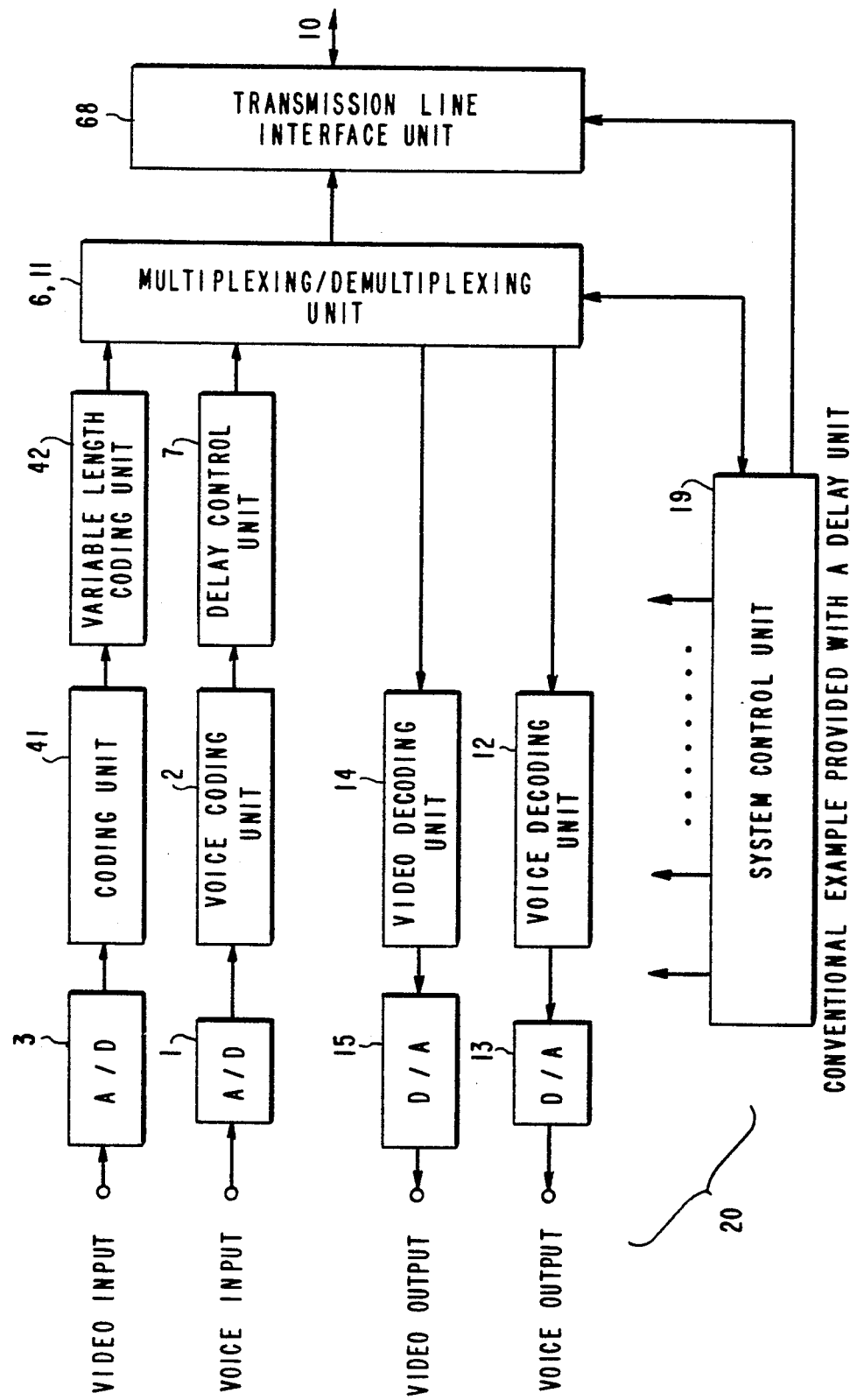
FIG. 3 shows a conventional example provided with a delay unit.

The case where a delay is anticipated and a fixed delay is given is explained below:

FIG. 3 shows the conventional constitution of a terminal office in a video and audio transmission system. Reference numeral 20 in the figure is a terminal office, 3 is an A/D converter for the video signal, 41 is a video coding unit, 42 is a variable length coding unit, 1 is an A/D converter for an audio signal, 2 is an audio coding unit, 7 is a delay control unit, 6 and 11 are multiplexing and demultiplexing units, 68 is a transmission line interface unit, 14 is a video decoding unit, 15 is a D/A converter, 12 is an audio decoding unit, 13 is a D/A converter, and 19 is a system control unit.

The video signal is processed by the video coding unit 3 and then processed for coding in variable lengths, then is supplied to the multiplexing and demultiplexing units 6 and 11. On the other hand, the audio signal is coded at the audio coding unit 2 to the 4 kHz band 16 kbps or 7 kHz band 56 kbps. Provision is made of a delay control unit 7 for giving a delay corresponding to the delay for coding the video signal. The signal is delayed at the said delay control unit 7 and supplied to the multiplexing and demultiplexing units 6 and 11.

Next, the video signal and audio signal are multiplexed and sent from the transmission line interface unit 68 to the opposing terminal office.

The signal received from the opposing terminal office is demultiplexed by the multiplexing and demultiplexing units 6 and 11 into a video signal and audio signal. The video signal passes through the video signal decoding unit 14 and D/A converter 15 and is fetched as the video output. The audio signal passes through the audio decoding unit 12 and D/A converter 13 and is fetched as the audio output.

Note that the amount of delay control T in the above-mentioned delay control unit 7 is given by:

$$T = (t_{v1} + t_{v2}) - (t_{A1} + t_{a2})$$

where, $t_{v1}$: delay time at the processing units 3, 41, and 42
$t_{v2}$: delay time at the processing units 14 and 15
$t_{A1}$: delay time at the processing units 1, 2, and 7
$t_{A2}$: delay time at the processing units 12 and 13

Further, the transmission line has line speeds in multiples of 64 kbps from 64 kbps to 384 kbps and is fixed in capacity. Therefore, as shown in FIG. 4, feedback control is performed and the coding processing in the video coding unit 4 is controlled.

Figure 4A:
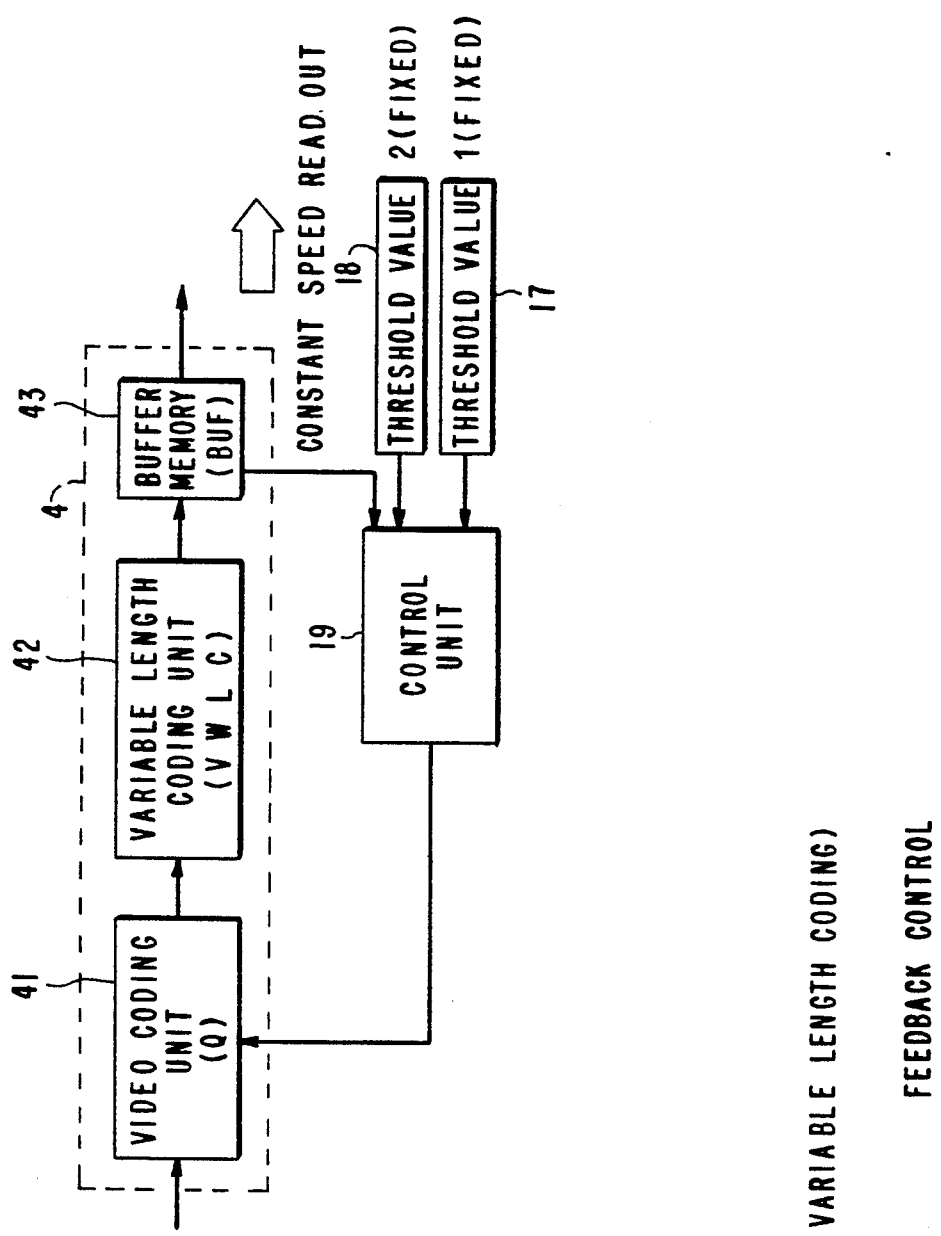
FIGS. 4(a) and 4(b) are explanatory views of the feedback control of a buffer portion in the system shown in FIG. 3.
Figure 4B:
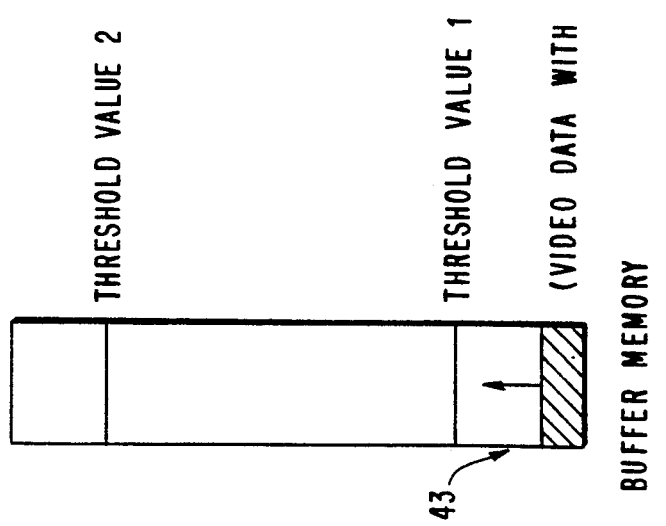
Figure 42:
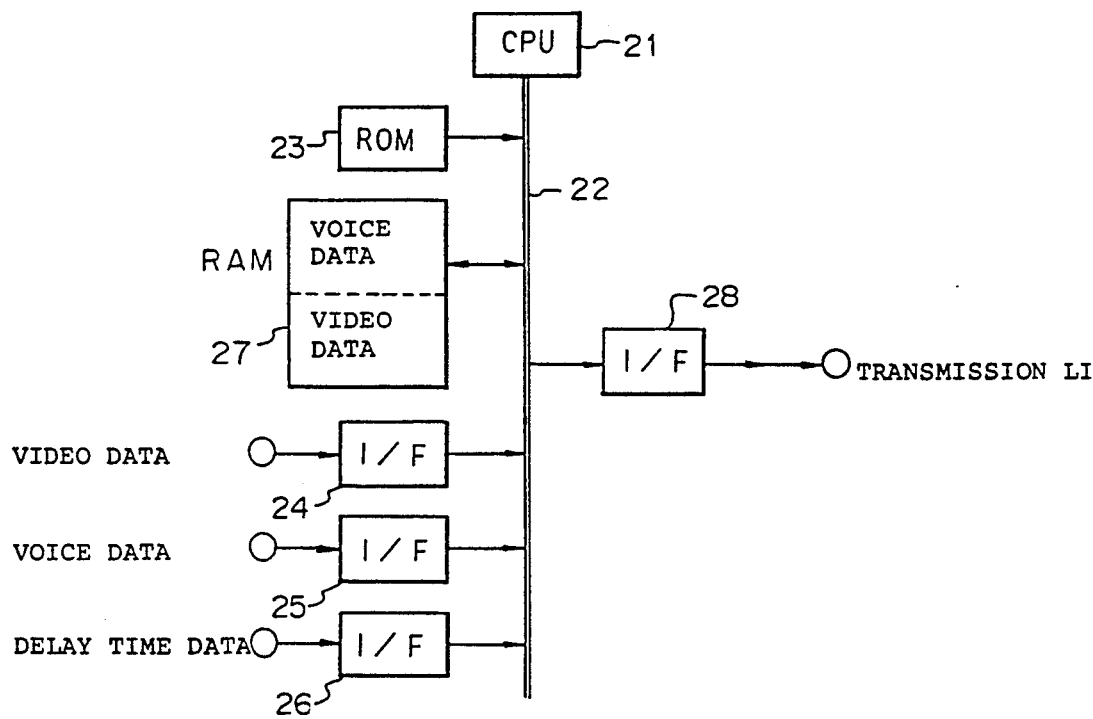
FIG. 42 is a block diagram showing an embodiment of the multiplexing and demultiplexing unit of the system shown in FIG. 39.

FIGS. 4(a) and 4(b) show the mode of the feedback control. Reference numerals 41, 4, and 19 in the figure correspond to FIG. 3, and 42 shows a variable length coding unit, 43 a buffer memory, 17 a first threshold value, and 18 a second threshold value. In the buffer memory 43 is stored the variable length coded video data. This is read out from the buffer memory 43 at a fixed speed and led to the multiplexing and demultiplexing units 6 and 11.

If, in accordance with the amount of video data stored in the buffer memory 43, the stage is reached where the storage amount exceeds the second threshold value 18 as shown in the illustration of FIG. 4(b), for example, the system control unit 19 commands the video coding unit 41 to stop the video coding. Alternatively, the quantification of the video coding unit is made rougher. Further, when the stage is reached where the storage amount falls to the first threshold value 17 or less, the system control unit 19 commands a restart of the video coding. Further, the quantification is made finer.

FIG. 5 shows the transmission frame format in the conventional case.

FIG. 5(A) shows the frame format in the case of 64 kbps, wherein an 8 kbps portion is allocated to the frame data portion, a 16 kbps portion is allocated to the sound, and a 40 kbps portion is allocated to the picture.

FIG. 5(B) shows the frame format in the case of 128 kbps. Two cases exist: one where 16 kbps is allocated to the sound (B-1) and one where 56 kbps is allocated to the sound (B-2). FIG. 5(C) shows the frame format in the case of 192 kbps, wherein either of the case of the above (B-1) or the case of (B-2) is used for the first half 128 kbps portion. Further, FIG. 5(D) is the frame format for the case of 384 kbps and is used as the video signal portion until 384 kbps is reached.

In the conventional case, as shown in FIG. 5, 16 kbps or 56 kbps is fixedly set as the audio portion. For the video signal, as explained with reference to FIG. 4(a), the processing in the video coding unit 41 is controlled by feedback control, but for the video signal, a transmission capacity of 16 kbps or 56 kbps is secured as mentioned above irregardless of the existence of silent periods in the sound.

Next, embodiments of the present invention will be described.

Figure 6:
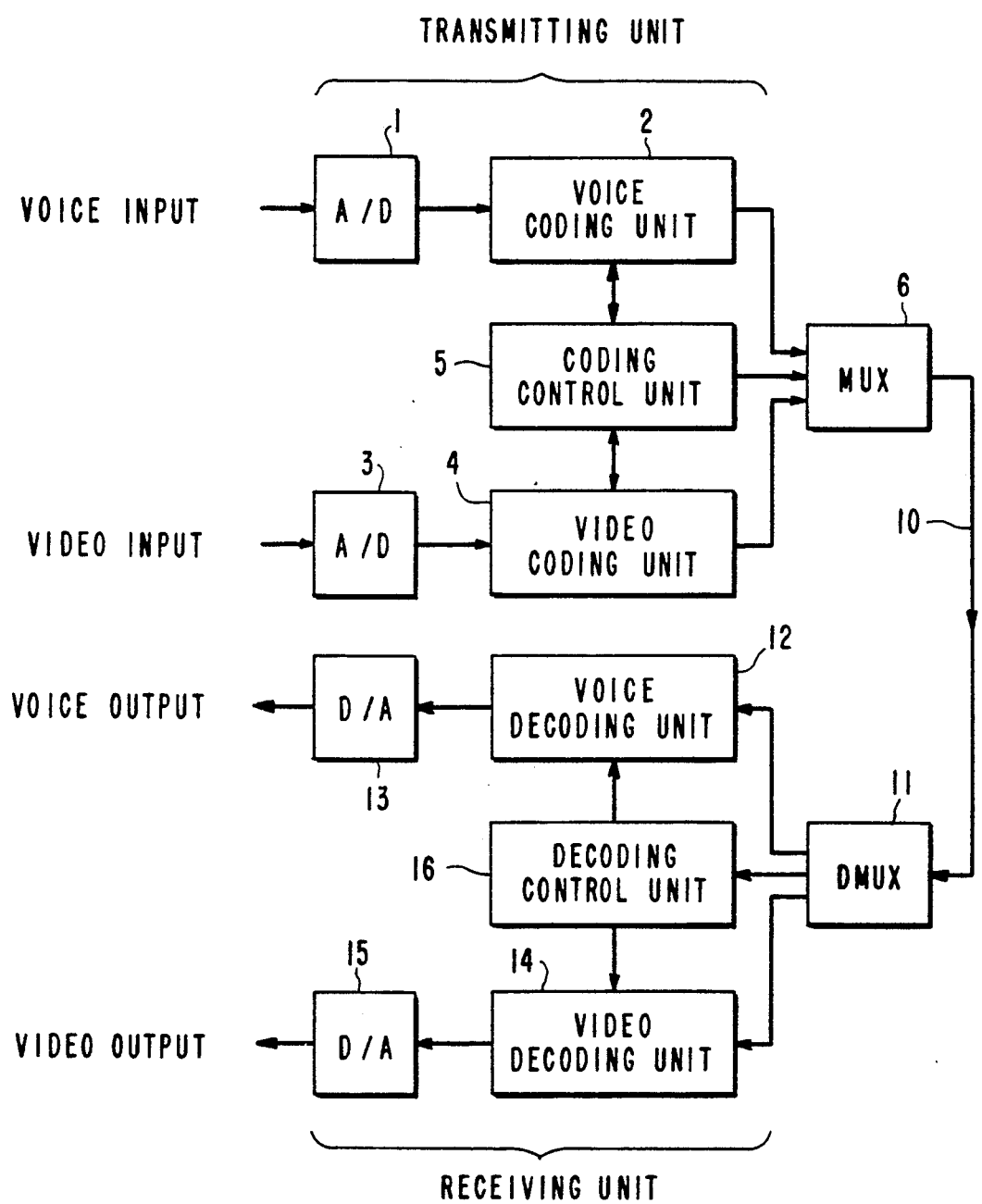
FIG. 6 is a view of the basic constitution of the present invention.

FIG. 6 is a view of the basic constitution of the present invention, which is comprised of a transmission unit and a reception unit.

Figure 7:
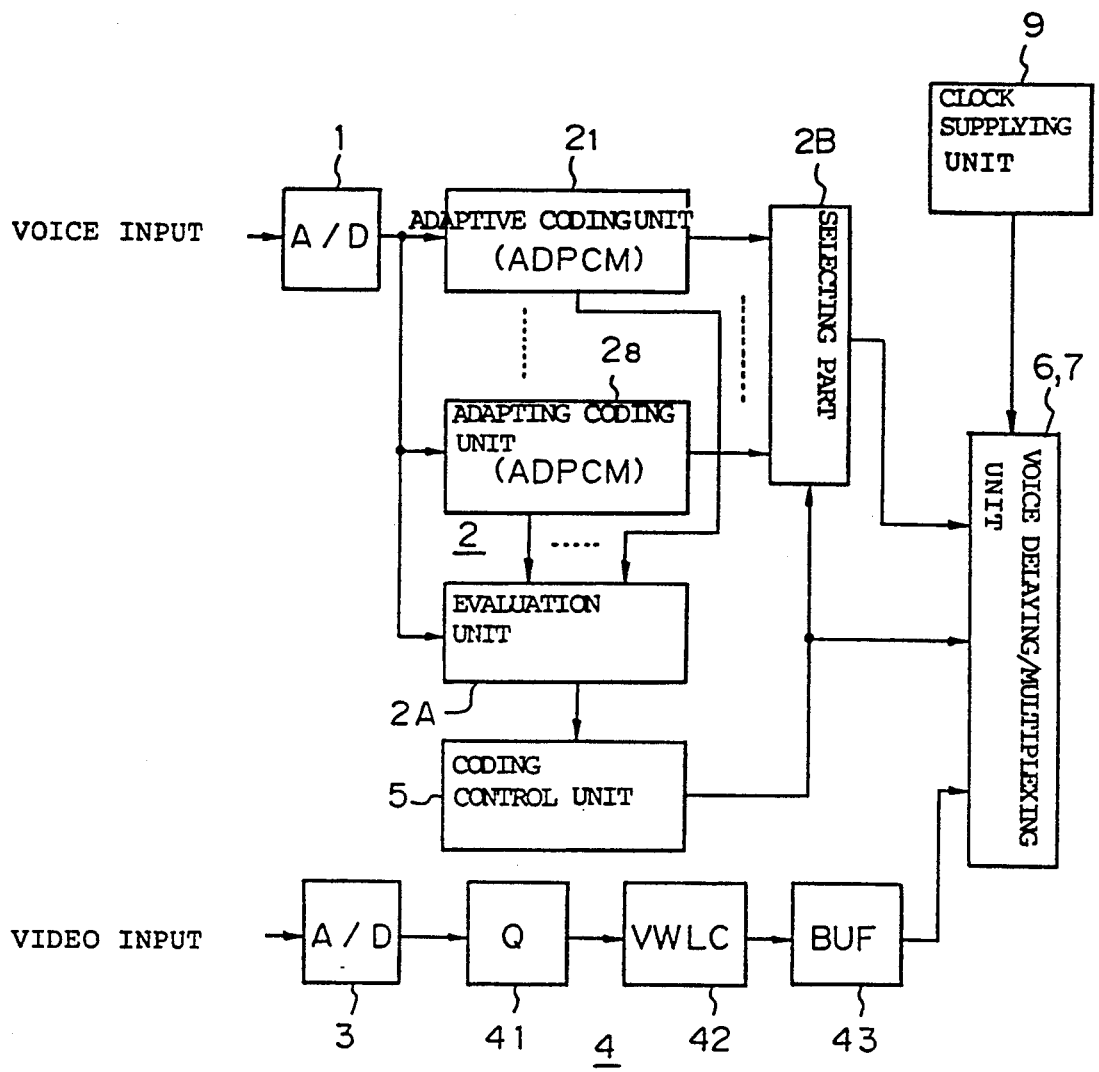
FIG. 7 is a block diagram of the transmitter side of an embodiment.

FIG. 7 shows one embodiment of the transmitter side of the video and audio multiplexing system of the present invention, in which embodiment the audio coding unit 2 is comprised by eight adaptive coding units (for example ADPCMs) $2_1$ to $2_8$ each with different number of coding bits with respect to the digital sound, an evaluation unit 2A for determining a coding bit rate based on a noise evaluation method from the reproduced outputs of the adaptive coding units $2_1$ to $2_8$ and the digital sound and generates a coding bit rate data, and a selection unit 2B for selecting the output audio data of the corresponding adaptive coding unit by the coding bit rate data. The coding control unit 5 substantially is operated by the evaluation unit 2A. Further, the video coding unit 4 is comprised of a coding unit (Q) 41 for coding and quantifying the digital picture from the A/D converter 3, a variable length coding unit (VWLC) 42 for coding in variable lengths the coded video data, and a buffer 43 for temporarily storing the variable length coded video data. Further, 9 is a clock supply unit of the transmission frame of transmission and reception.

Figure 8:
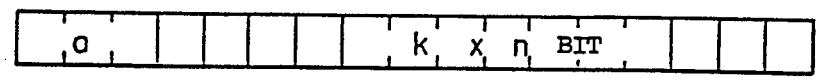
FIG. 8 shows the audio frame format.

The frame (packet) format of the audio data output from the adaptive coding units $2_1$ to $2_8$ is as shown in FIG. 8. It is comprised of a frame header a and a series of audio data following the frame header a and is comprised of a number of bits of the number of coding bits k of the adaptive coding unit receiving the optimal noise evaluation multiplied by the sampling rate n (n=8 kHz).

Figure 9:
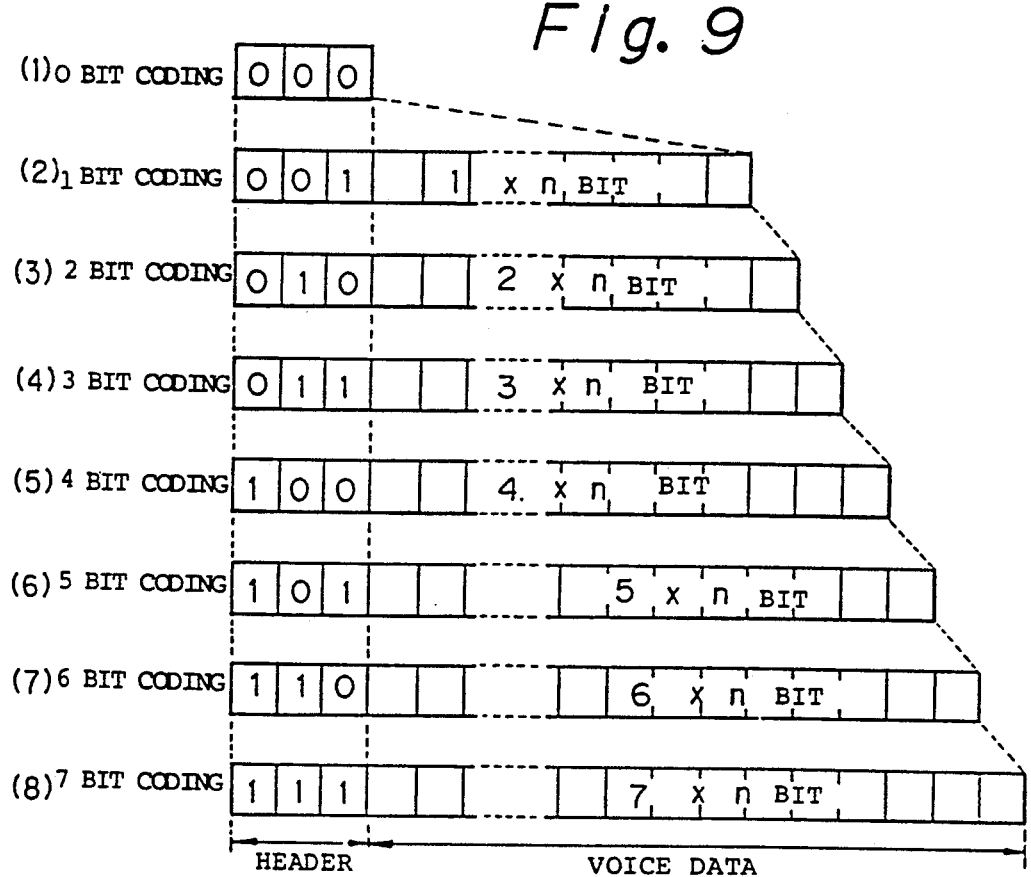
FIG. 9 shows the audio frame format of different bit numbers.

Examples of the 0 to 7 bit coded audio frames of the adaptive coding units $2_1$ to $2_8$ are shown in FIG. 9. One of these is selected by the selection unit 2B and sent to the multiplexing unit.

Figure 10:
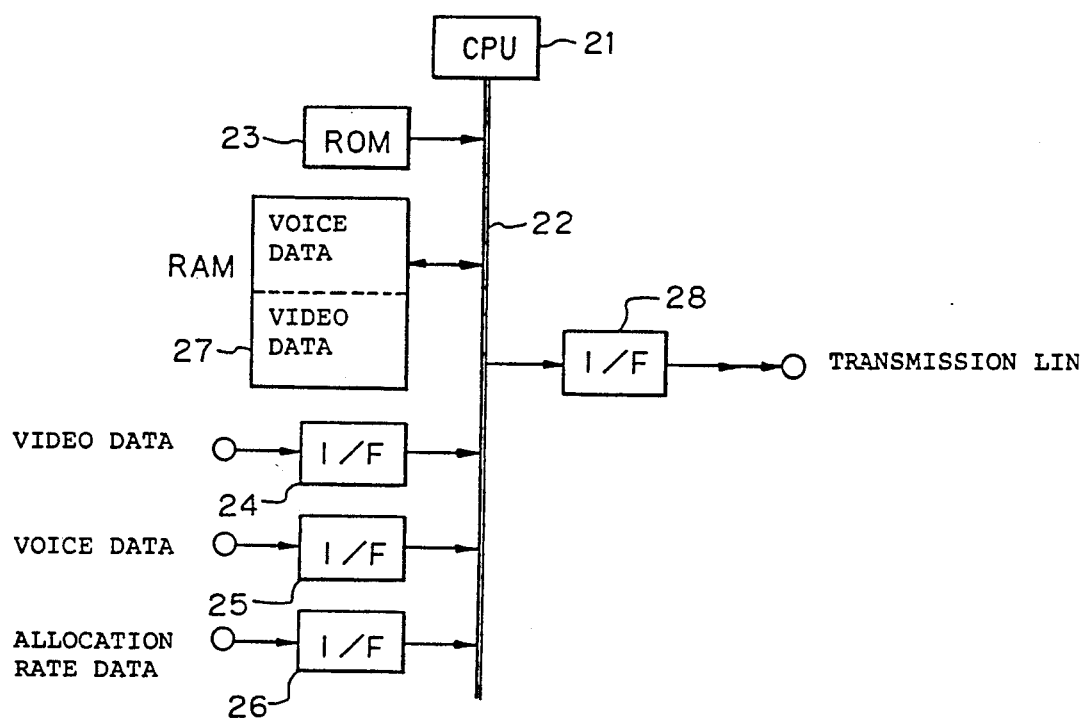
FIG. 10 shows an example of the constitution of the multiplexing and demultiplexing unit.

FIG. 10 shows an embodiment of the audio delay and multiplexing units 6 and 7. In this embodiment, the unit is comprised of a CPU 21, a CPU bus 22, a ROM 23 for storing programs for sending out data to the transmission line in the frame formats shown in FIG. 9, interfaces (I/F) 24 to 26 for fetching to the bus 22 video data, audio data, and coding bit rate data, a RAM 27 having an address space for temporarily writing in the video data, audio data, and bit rate data from the interfaces 24 to 26, and an interface 28 for transmitting various types of data to the transmission line.

Figure 2A:
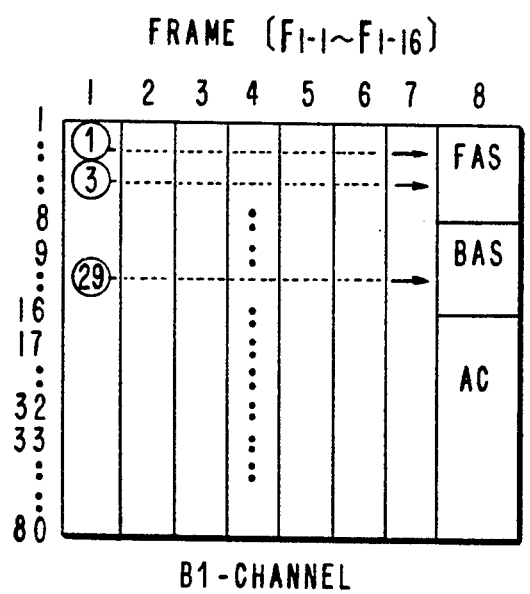
FIGS. 2(a) and 2(b) show the transmission format based on CCITT draft recommendation Y.221.
Figure 2B:
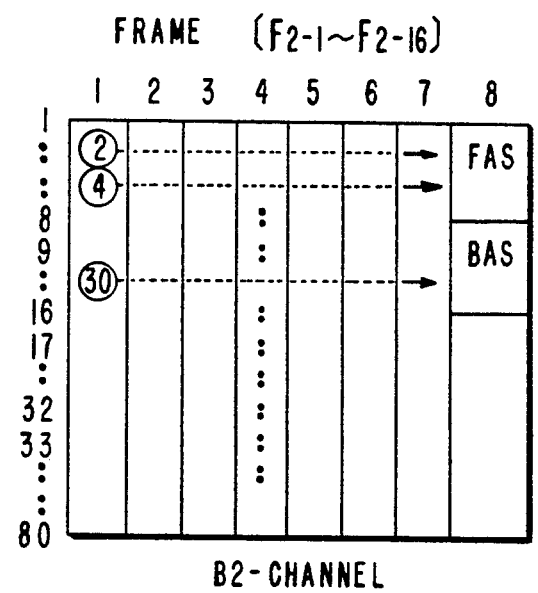

The transmission frame format shown in FIG. 2 is one which allocates bits based on the CCITT draft recommendation Y.221. In the multiframes, 16 transmission frames constitute one unit (1 multiframe = 16 transmission frames), and 8 bits horizontally and 80 bits vertically, for a total of 640 bits, constitute one transmission frame. Further, one transmission frame is comprised of audio data, video data, and FAS (frame alignment signal) data and BAS (bit allocation signal) data as the control data (AC (application channel) data). Also, one multiframe is comprised of 16 transmission frames, as mentioned above, but the data is comprised and sent as shown in FIG. 2(a) and (b) in the direction of [1]→[30] in pairs of two transmission frames, for example, $F_{1-1}$ to $F_{1-16}$ and $F_{2-1}$ to $F_{2-16}$. The FAS data and the BAS data, however, are different in the transmission frames $F_1$ and $F_2$.

The FAS data is frame data and is used for establishing synchronization by the synchronization procedures of (1) the Y.221 frame synchronization and (2) multiframe synchronization. That is, it is possible to distinguish frame units by the above (1) and it is possible to differentiate frames by (2). Further, discrimination of all frames is necessary for recognizing response units with respect to changes in the BAS (bit allocation signal) data, as explained later.

Figure 12:
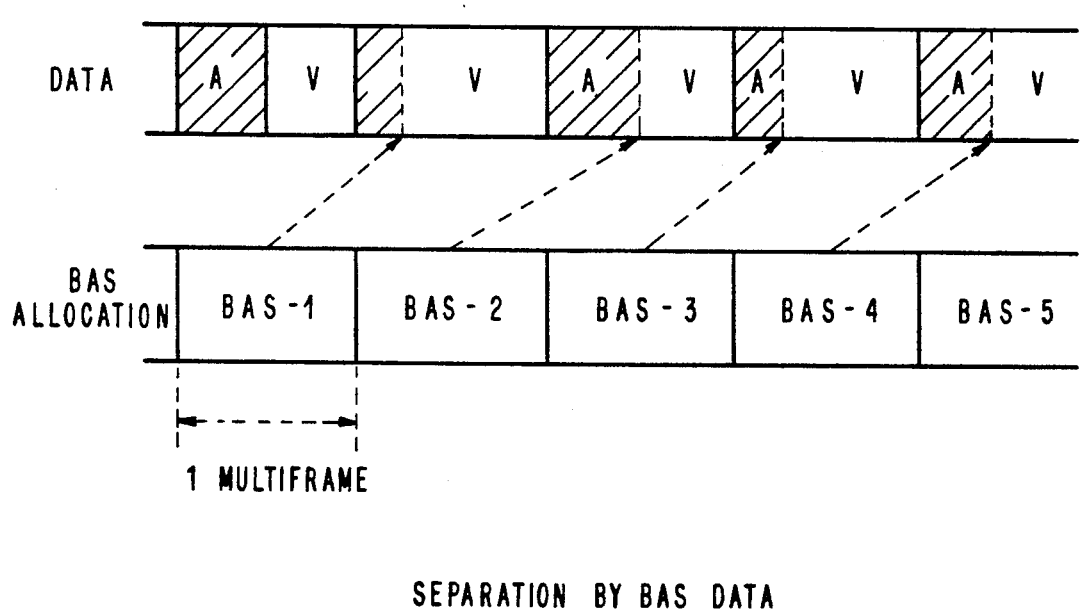
FIG. 12 is an explanatory view of the demultiplexing of a coding bit rate from BAS data.

The BAS data sets the coding data of the amount of audio information and the amount of video data at the transmitter side (for example, the coding bit rates). By the receipt of the coding bit rate data from the evaluation unit 2A, the coding bit rate is incorporated in the BAS data as shown in FIG. 11 and transmitted. After the establishment of the frame synchronization, it is used at the receiver side for demultiplexing of the data. The BAS data is judged every sub-multiframe (one multiframe=2 sub-multiframes). As shown in FIG. 12, the next coding bit rate is detected in accordance with the majority logic (five frames or more out of the eight frames) from the BAS data just before.

Next, an explanation will be made of the transmission frame operation by the embodiment.

In the multiplexing unit 6 in the case of use of the above-mentioned transmission frame data (FIG. 2), the bit distribution is decided on in accordance with the coding bit rate stored as BAS data by the CPU 21. In the above way, the frames are comprised of "8×n" bits if eliminating the frame header by including it in the BAS data, so the frame allocation can be optimally performed as shown in FIG. 13.

Figure 13:
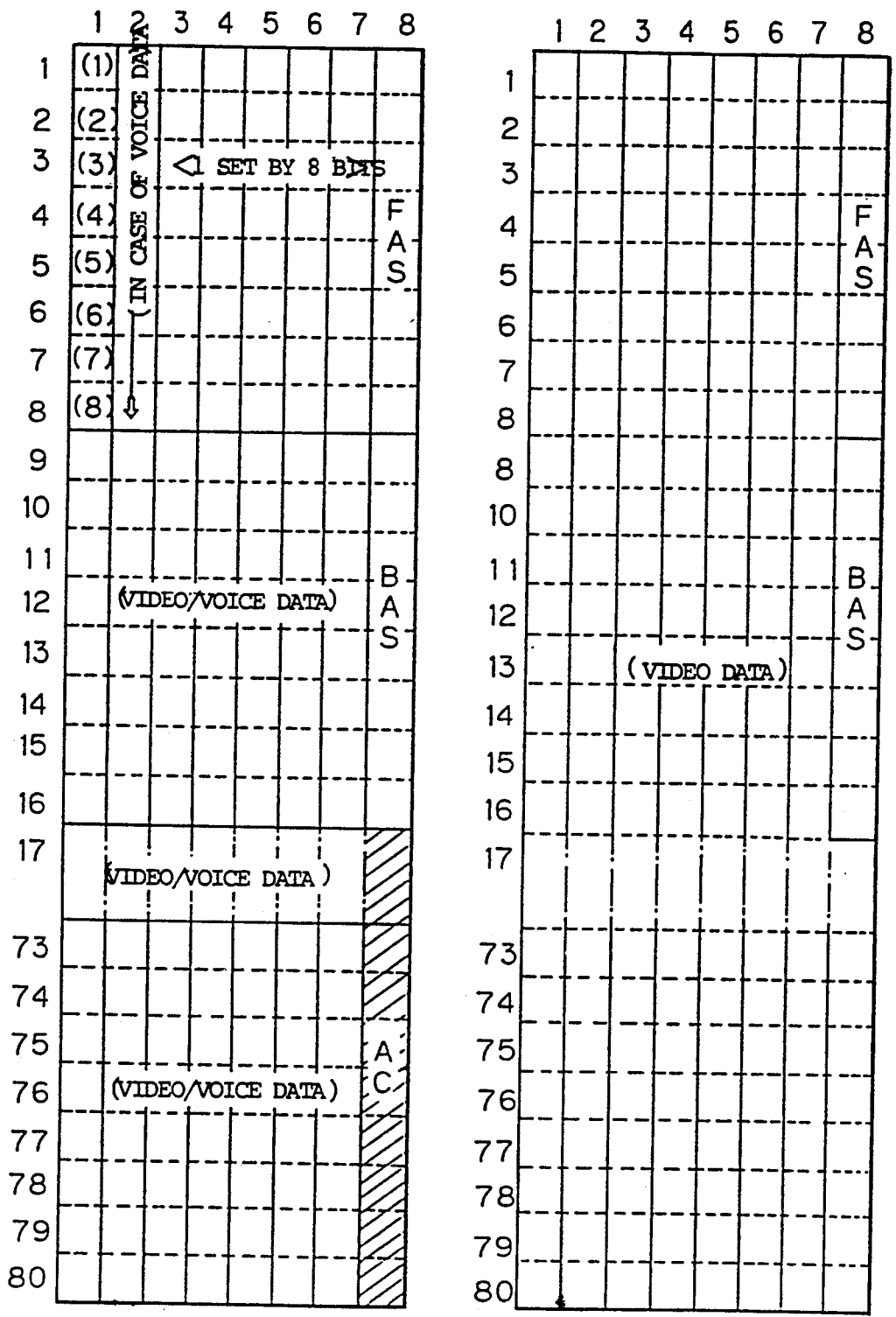
FIG. 13 is an explanatory view showing the allocation of data to a transmission frame.
Figure 14:
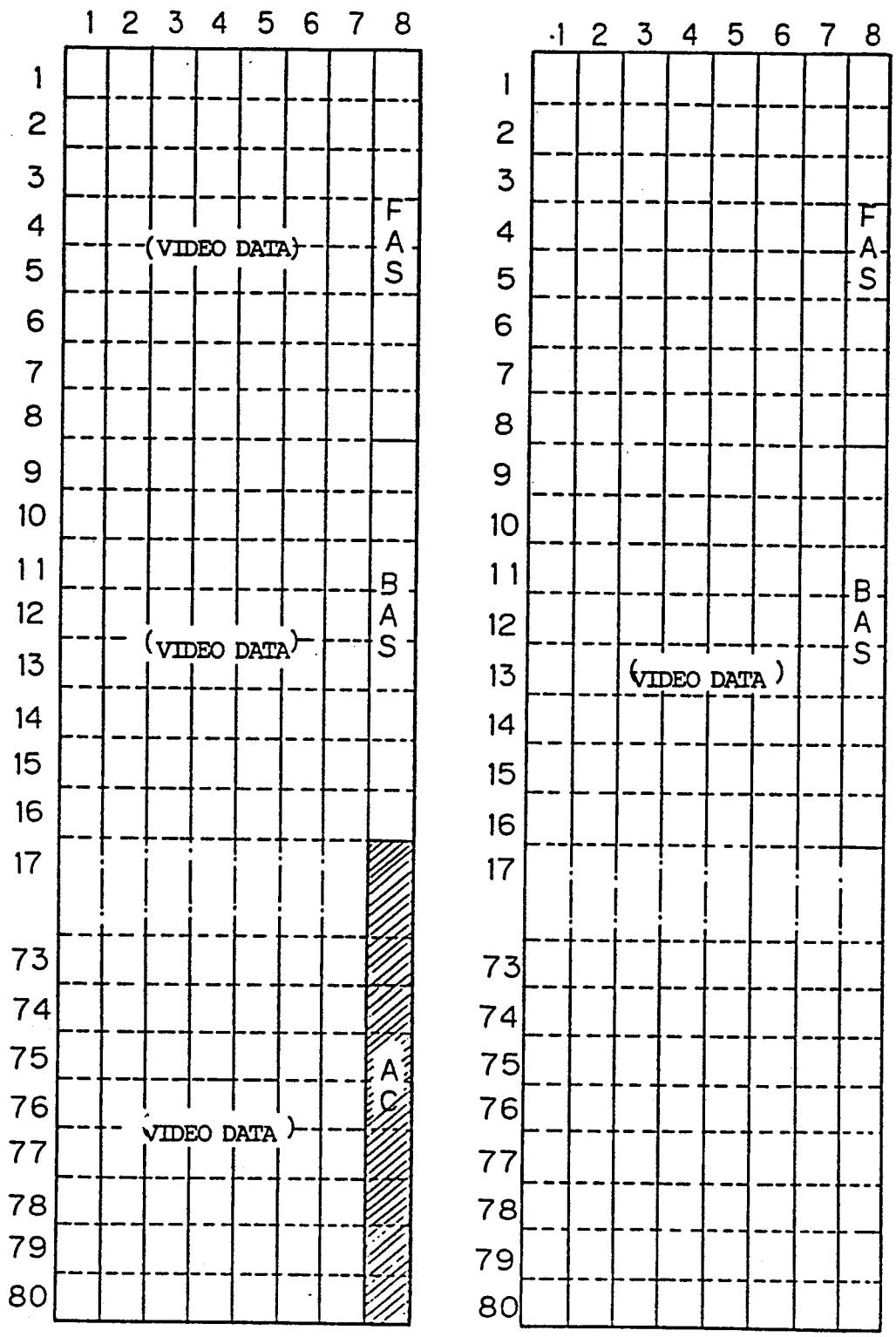
FIG. 14 to FIG. 17 show examples of the transmission frames when changing the number of bits of audio data.
Figure 15:
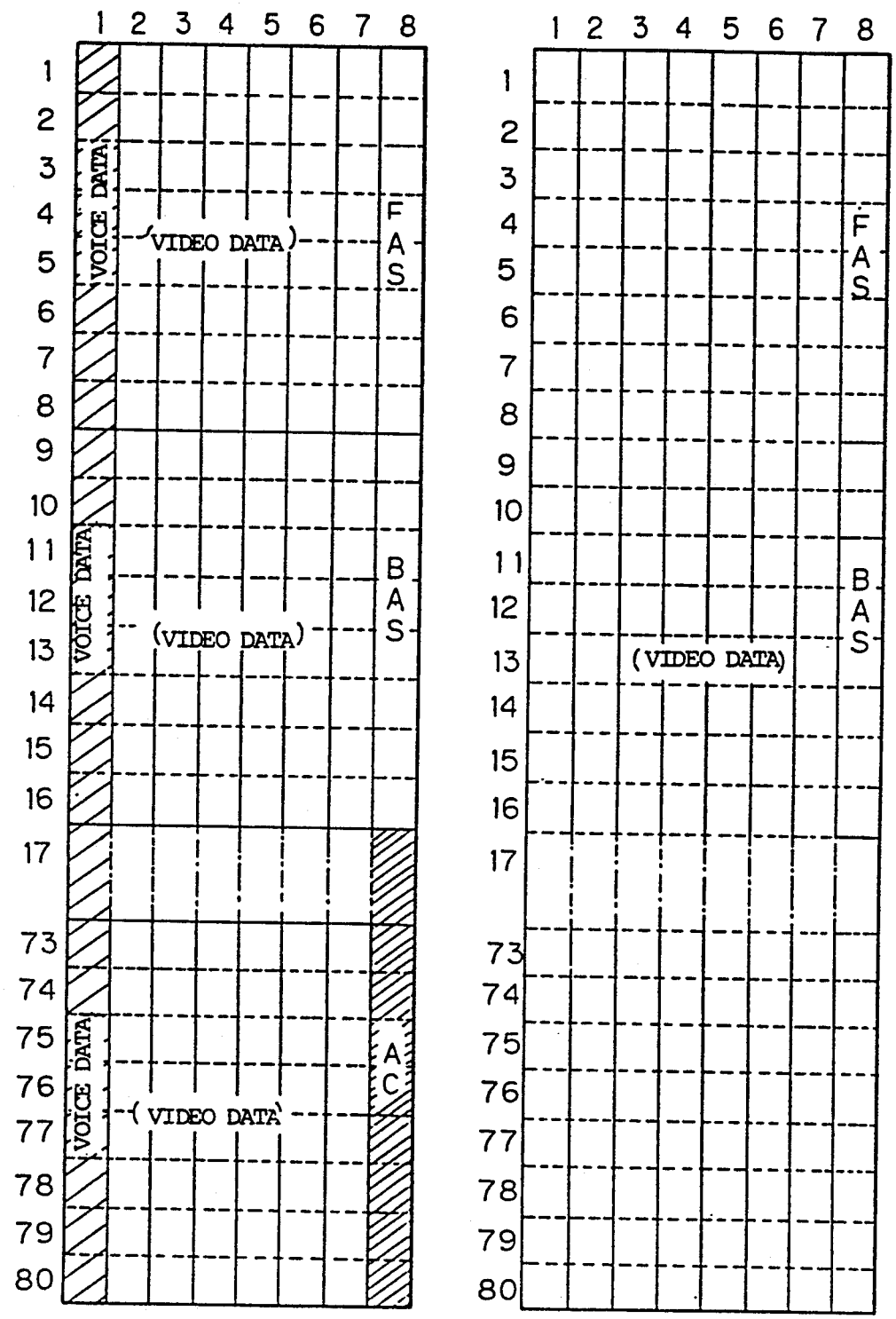
Figure 16:
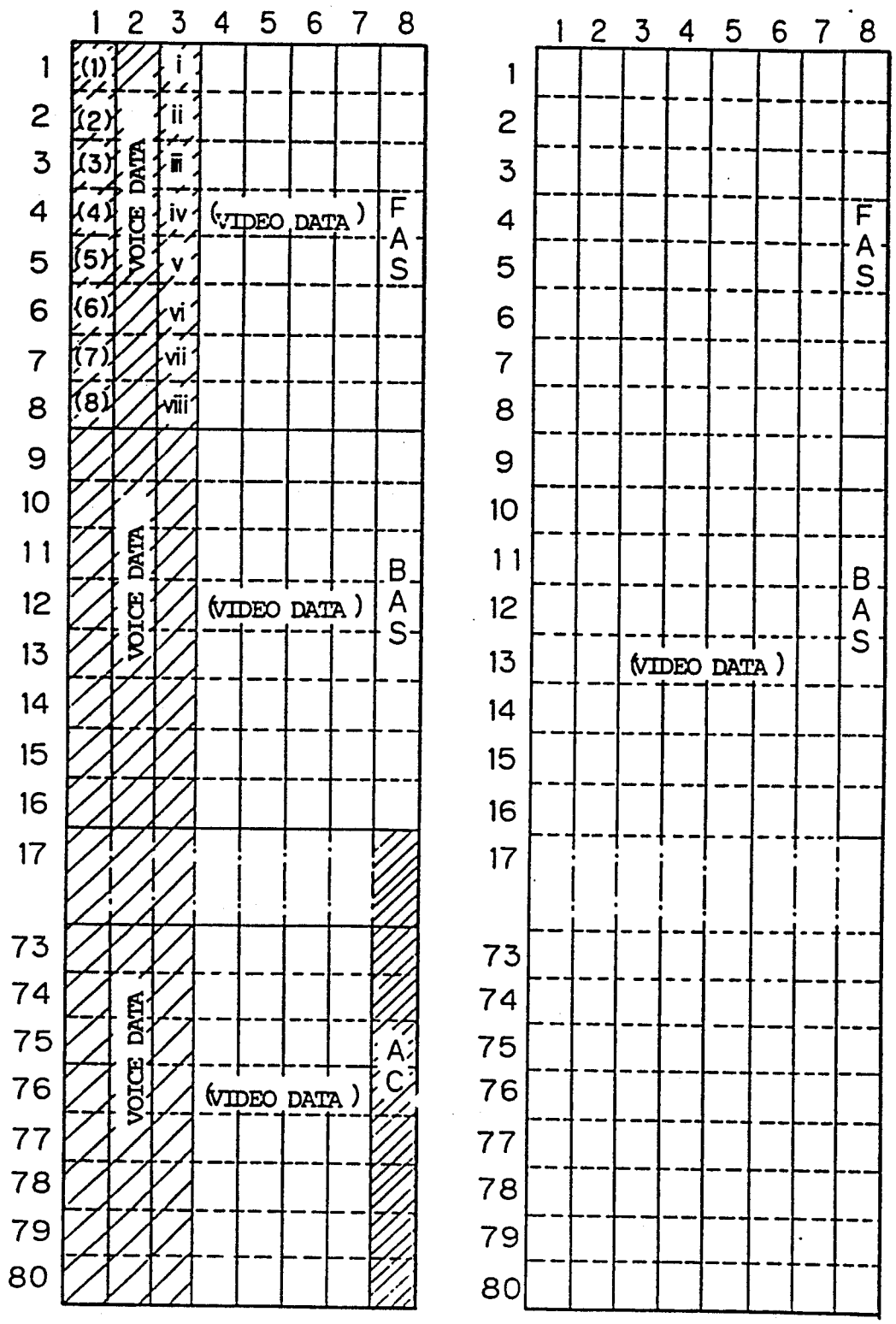
Figure 17:
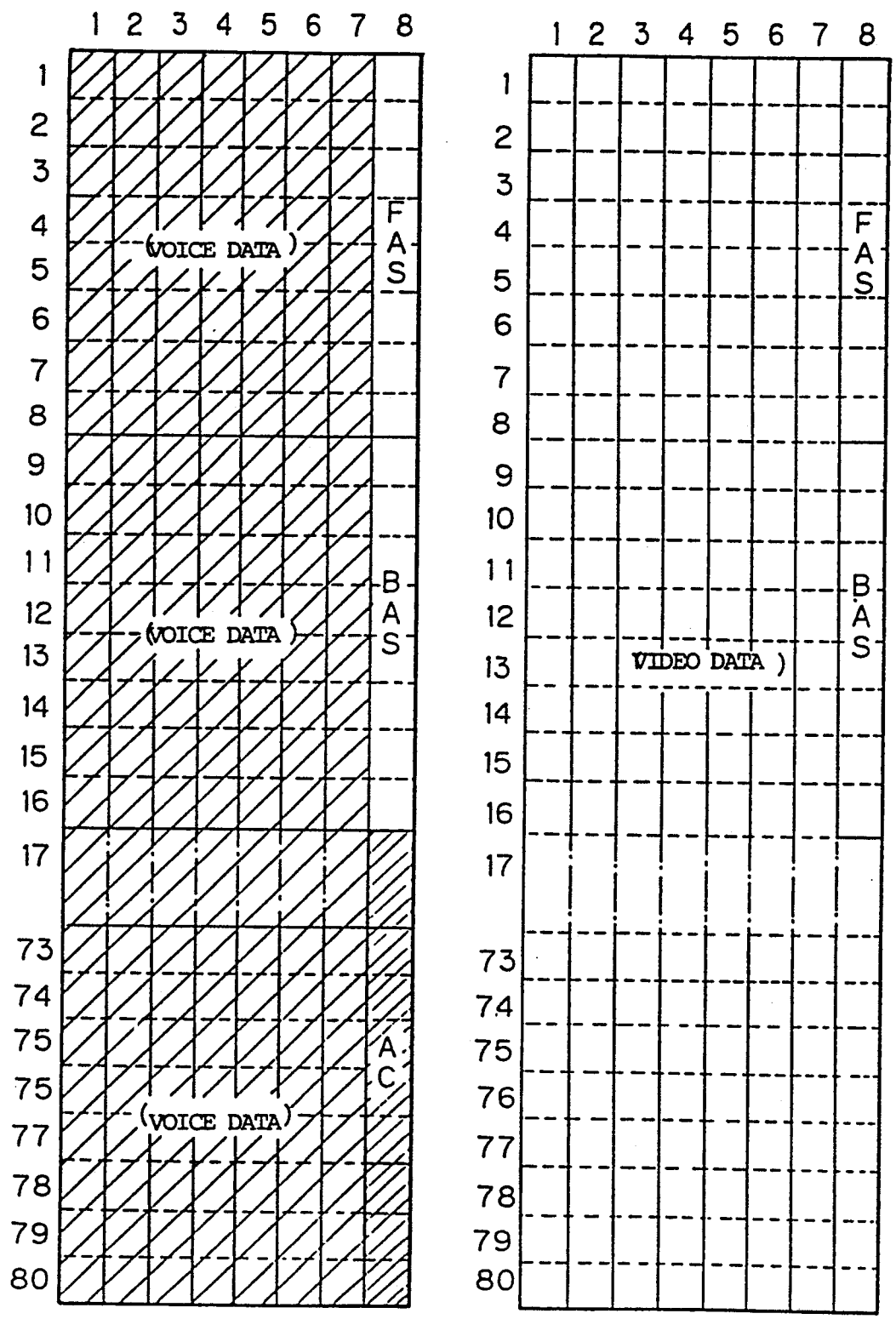
Figure 21:
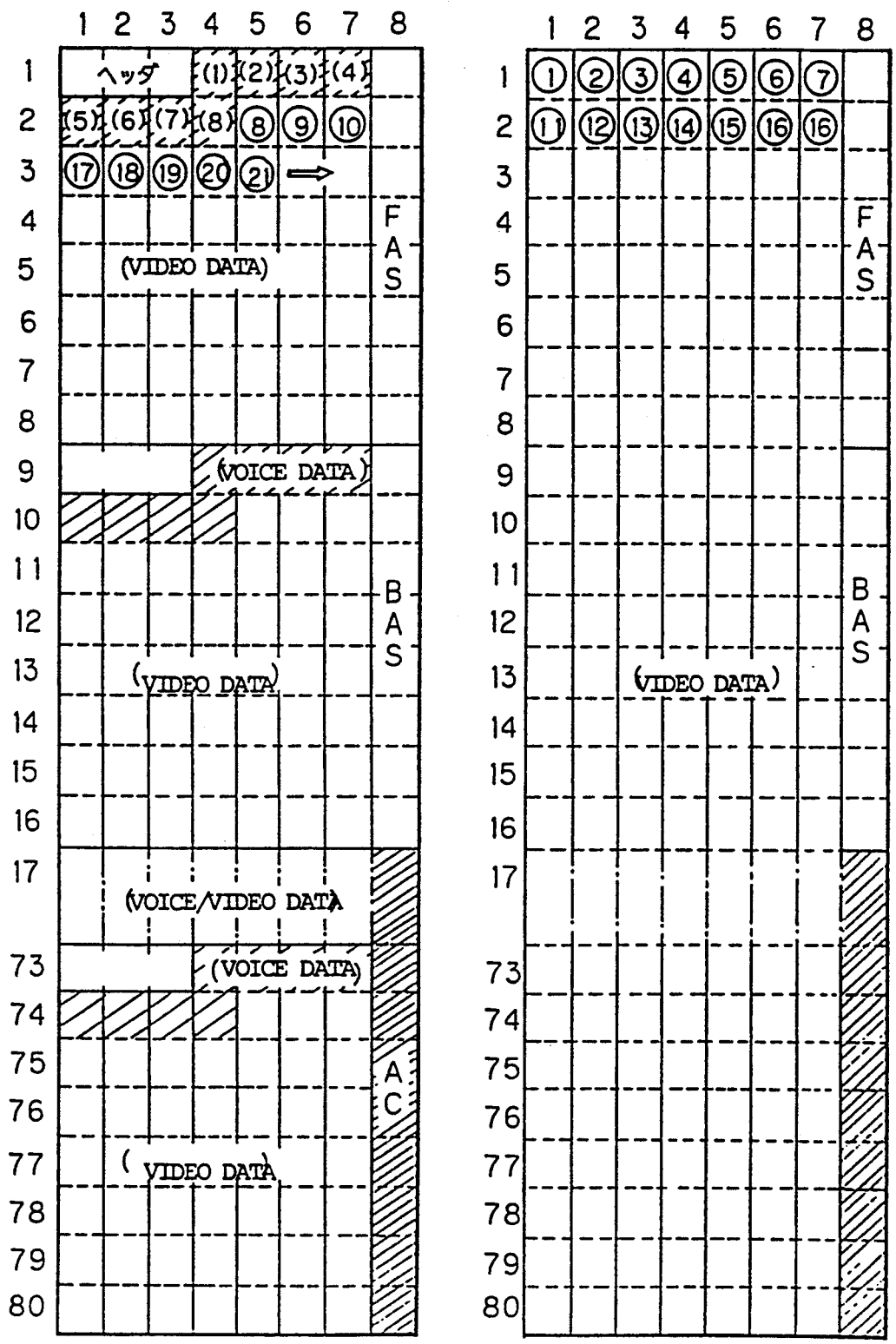
Figure 22:
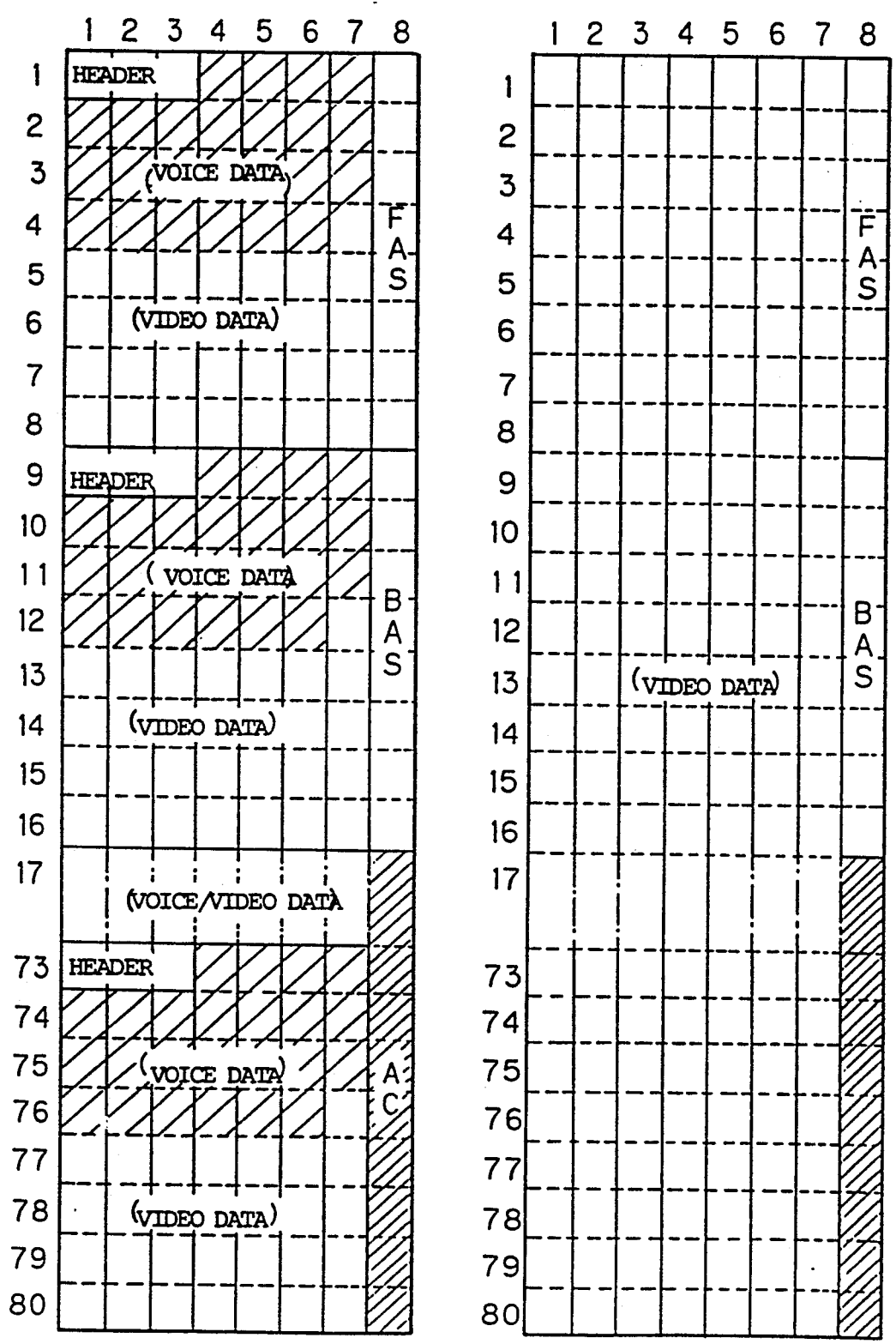

That is, if audio data is filled up to one to seven bits (horizontal axis) in the right direction for each 8 bit units in the vertical direction, for example (for example, shown by (1) to (8) in FIG. 13), there is a shift to the 8 bit group of the lower stage and the audio data is filled successively in the form of correspondence with the selected coding bit rate.

At this time, the audio data and the video data are filled in for each one stage of vertical 8 bit units. The video data is filled in the remaining portions from the buffer 43 after completion of filling in of the stages of audio data.

A single transmission frame is formed in this way. FIG. 14 to FIG. 17 show the relationship between audio data and video data in a single transmission frame in the case of 0-bit coding, 1-bit coding, 3-bit coding, and 7-bit coding.

Further, in the embodiment, the audio frame header is included in the BAS data, so the audio coding rate can be changed with each "1 multiframe" (=16 frames).

Figure 23:
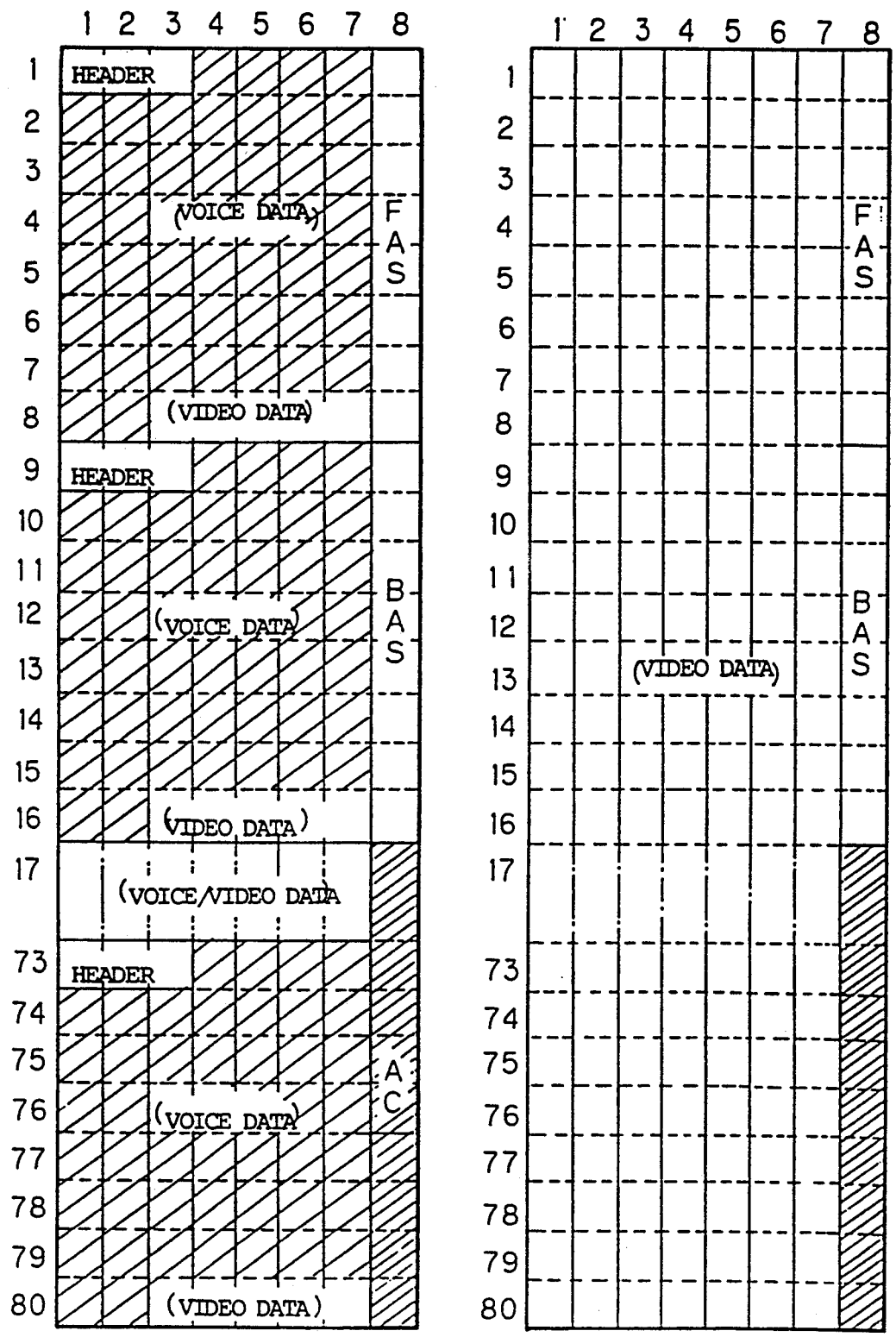

Further, if the frame header is included in the BAS data in this way, the data can be stored for every 8 bits, so there is the advantage of no partial data being caused as in the later mentioned FIG. 23.

The format of the transmission frame in the case where the audio frame header is not included in the BAS data is shown in FIG. 18. In this case, the header is considered 3-bit data of one vertical bit and 3 horizontal bits, as illustrated (see FIG. 9). When writing audio and video data in the horizontal direction as shown in FIG. 19, each transmission frame is formed for the case of 0-bit coding, 1-bit coding, 3-bit coding, and 7-bit coding as shown in FIG. 20 to FIG. 23.

The transmission frame comprised of the audio data and video data is stored in the RAM 27. When the transmission frame is completed (640 bits' worth), the data is sent out to the transmission line 10 at a rate matching the transmission speed.

On the other hand, the demultiplexing unit at the receiver side has the same construction as the multiplexing unit 7 shown in FIG. 10 but with the arrows in the opposite direction.

That is, the input data from the transmission line is subjected to (1) Y.21 frame synchronization and (2) multiframe synchronization by analyzing the FAS data, as mentioned above. Then, the data is demultiplexed by the demultiplexing unit 11 based on the BAS data, and the demultiplexed signal data is passed through the various interfaces, with the coded bit rate data sent to the decoding control unit 16, the audio data to the audio decoding unit 12, and the video data to the video decoding unit 14.

Next, the audio decoding unit 12 receives the decoding bit rate data from the decoding control unit and decodes the audio data in accordance with that bit rate.

In this way, the transmission frame used in the present invention is fixed in bit length, so to make the coding rate variable for each transmission frame, the operation synchronized with the transmission line clock rate is performed by extracting at the receiver side the clock from the clock supply unit 9 shown in FIG. 7 (in case of CMI coding). However, in RS 422 or INCU, the clock is supplied by a separate system.

Figure 24:
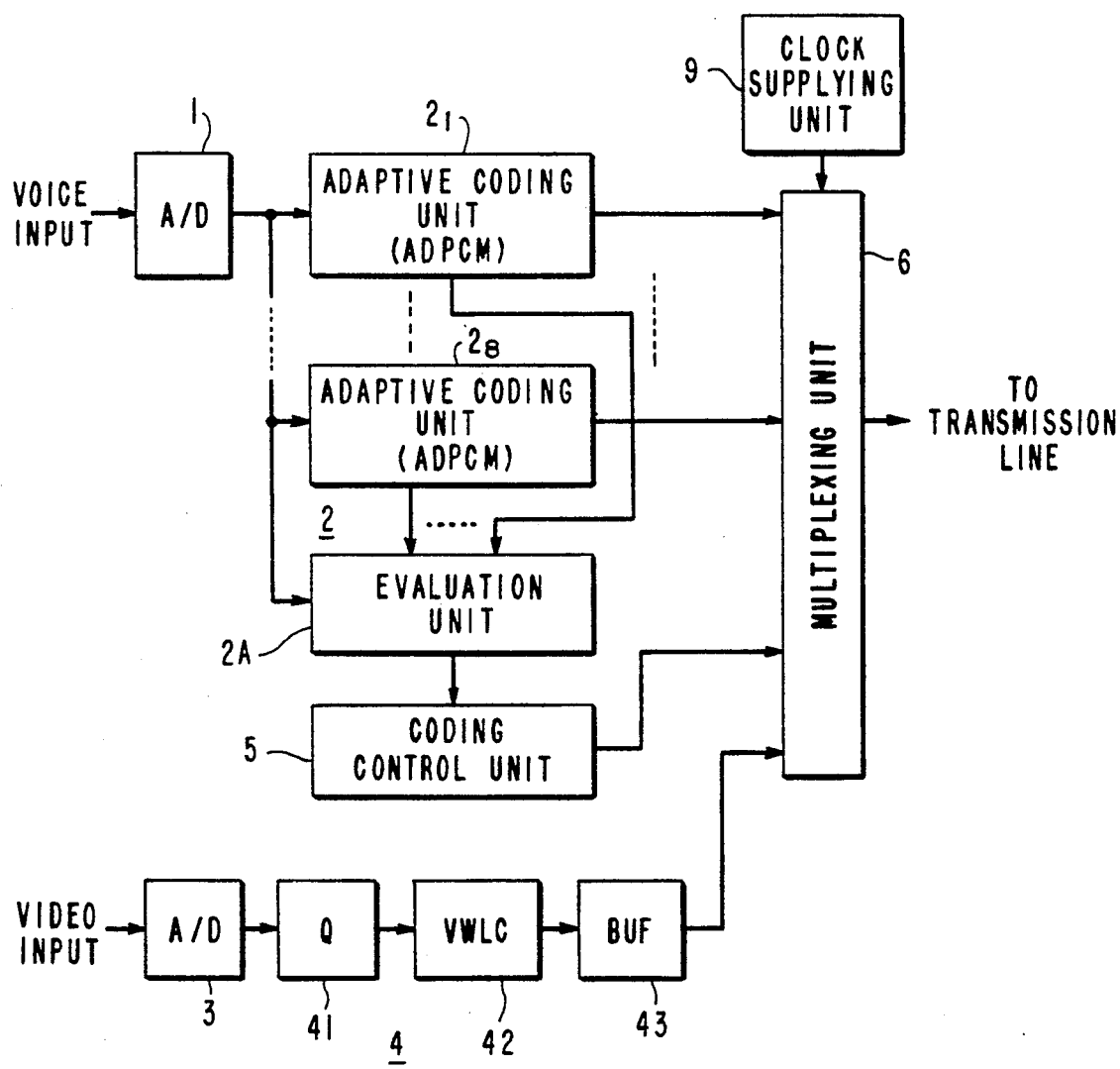
FIG. 24 shows an example of shifting of the selection unit of the bit rate to the multiplexing unit in the system shown in FIG. 7.

In the above-mentioned embodiment, further,. the outputs of the adaptive coding units $2_1$ to $2_8$ are input through the selection unit 2B to the multiplexing unit 6, but in the embodiment of FIG. 24, the outputs of the adaptive coding units $2_1$ to $2_8$ are input to the multiplexing unit 6 as they are and the select data is also sent to the multiplexing unit 6.

Figure 25:
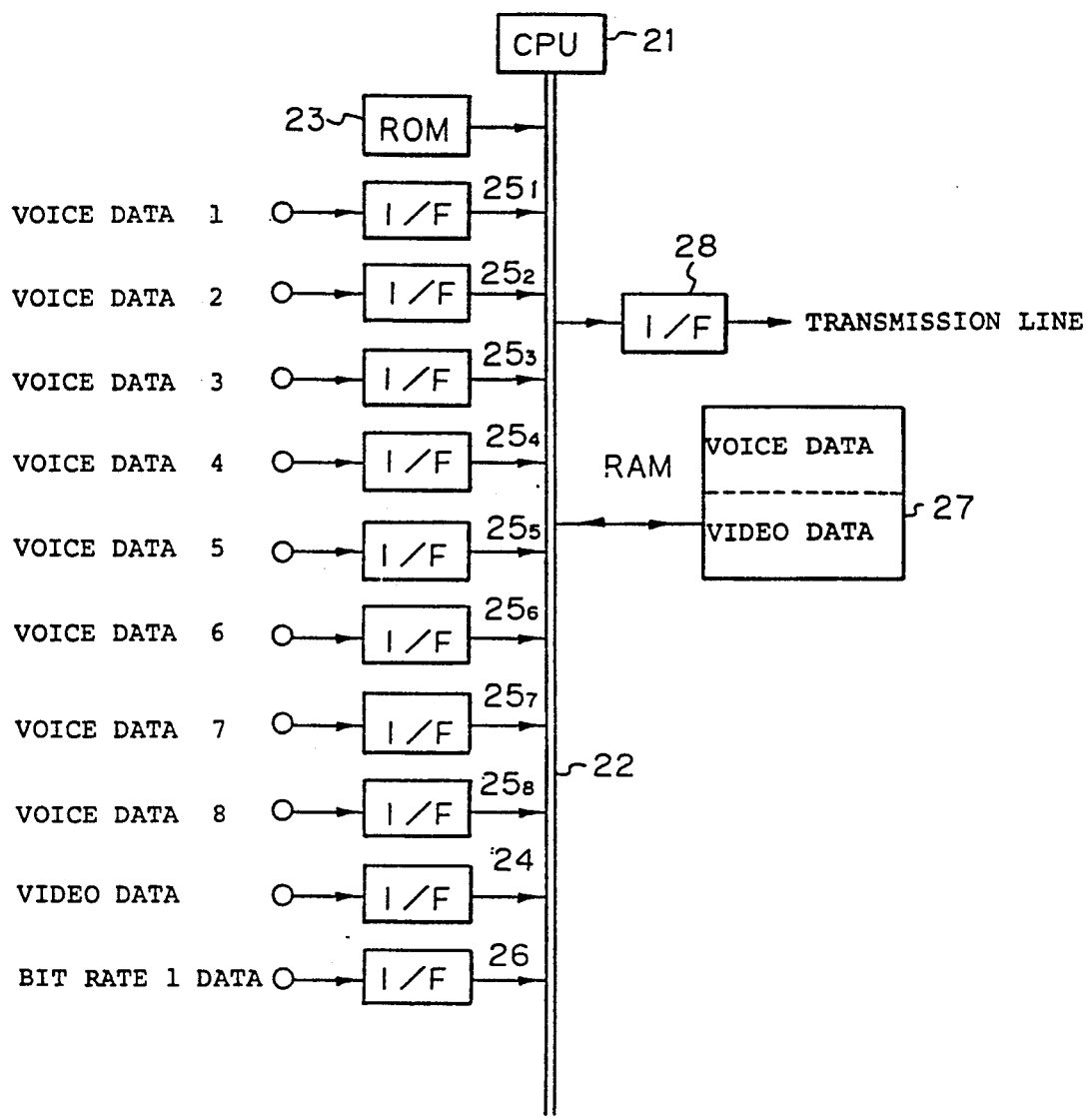
FIG. 25 shows an example of the constitution of the multiplexing and demultiplexing unit of the system shown in FIG. 24.

The system construction of the multiplexing unit 6 in this case is shown in FIG. 25. The output audio data of the adaptive coding units $2_1$ to $2_8$ are received through the interfaces $25_1$ to $25_8$. One of the outputs of these is selected by the coding bit rate data and stored as the audio data in the RAM 27.

In the present invention, the redundancy is compressed by the adaptive audio coding unit 2 suitably changing the bit rate in accordance with the amount of data of the input sound, and the coded audio data and the bit rate data are sent to the multiplexing unit 6.

By this, the multiplexing unit 6 multiplexes the audio data, bit rate data, and the video data from the video coding unit 4. At this time, the transmission frame from the multiplexing unit is of a fixed length, so it is possible to increase the amount of the video data by the amount of compression of the audio data and the reduction in the number of bits.

The transmission frame sent to the receiver side in this way is demultiplexed to video data, audio data, and bit rate data by the demultiplexing unit 11. At the audio decoding unit 12, the audio data is decoded in accordance with that bit rate.

Figure 26:
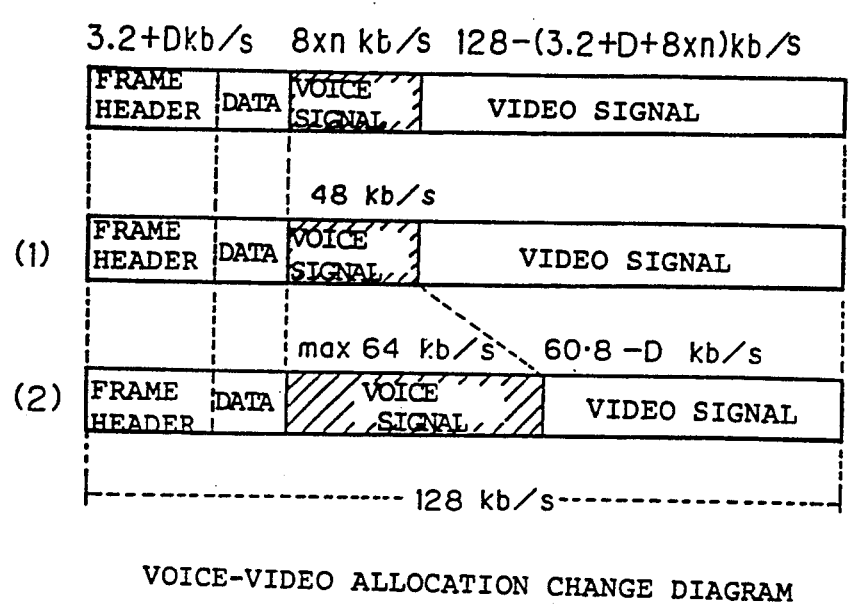
FIG. 26 shows the changes in the transmission ratio of sound and picture.

In this way, the data sharing of the amount of audio data and the amount of video data changes. This is shown in FIG. 26(1) to (3).

Figure 27:
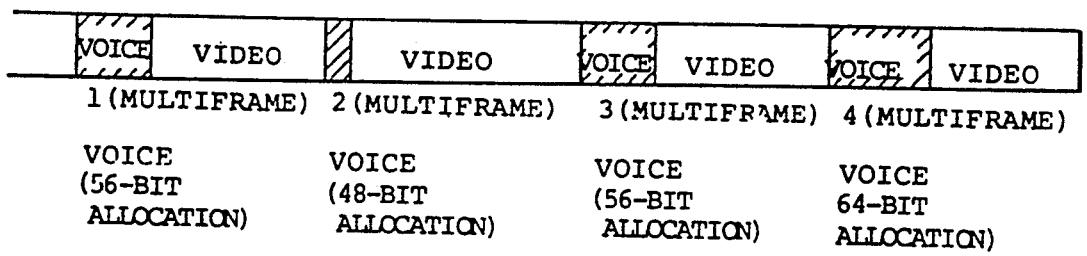
FIG. 27 shows the concept of the transmission of data in the case of a change in the transmission ratio of sound and picture.

Further, FIG. 27 shows the multiplexed transmission data. As shown in the figure, the video and audio data are sent for each fixed frame unit. The audio signal differs in the amount of transmission data in accordance with the magnitude of the amount of data, the video data is inserted into the empty regions, and thus the picture quality is improved, it will be understood.

Figure 28:
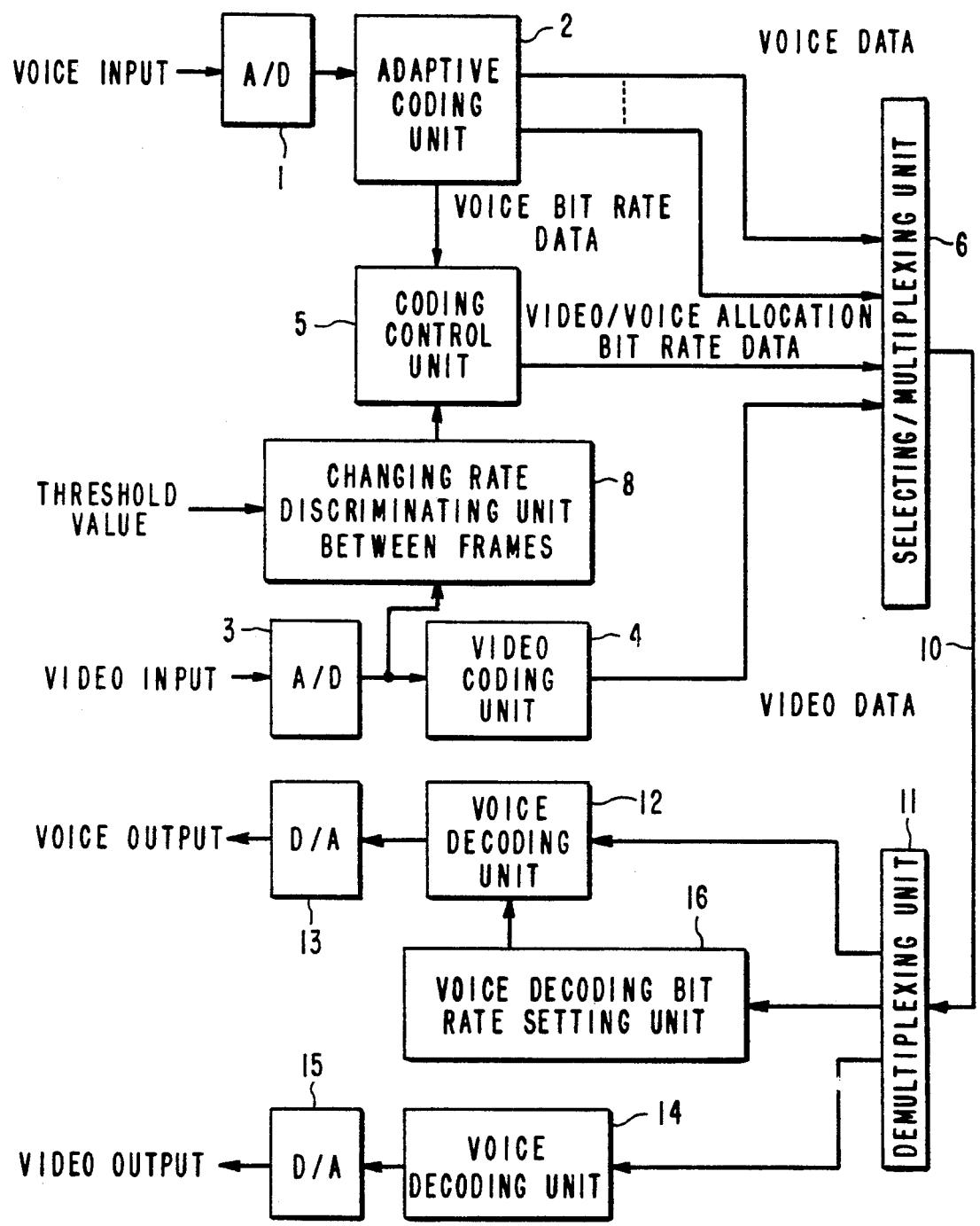
FIG. 28 shows the basic constitution of another embodiment.

In the embodiment of FIG. 7, the optimal bit rate of the sound from the audio coding unit 2 was input to the coding control unit 5 and used as is as the allocation signal. However, the content of the video data may also be considered in determining the transmission ratio, as in the following embodiment, whose principle is shown in FIG. 28.

Figure 29:
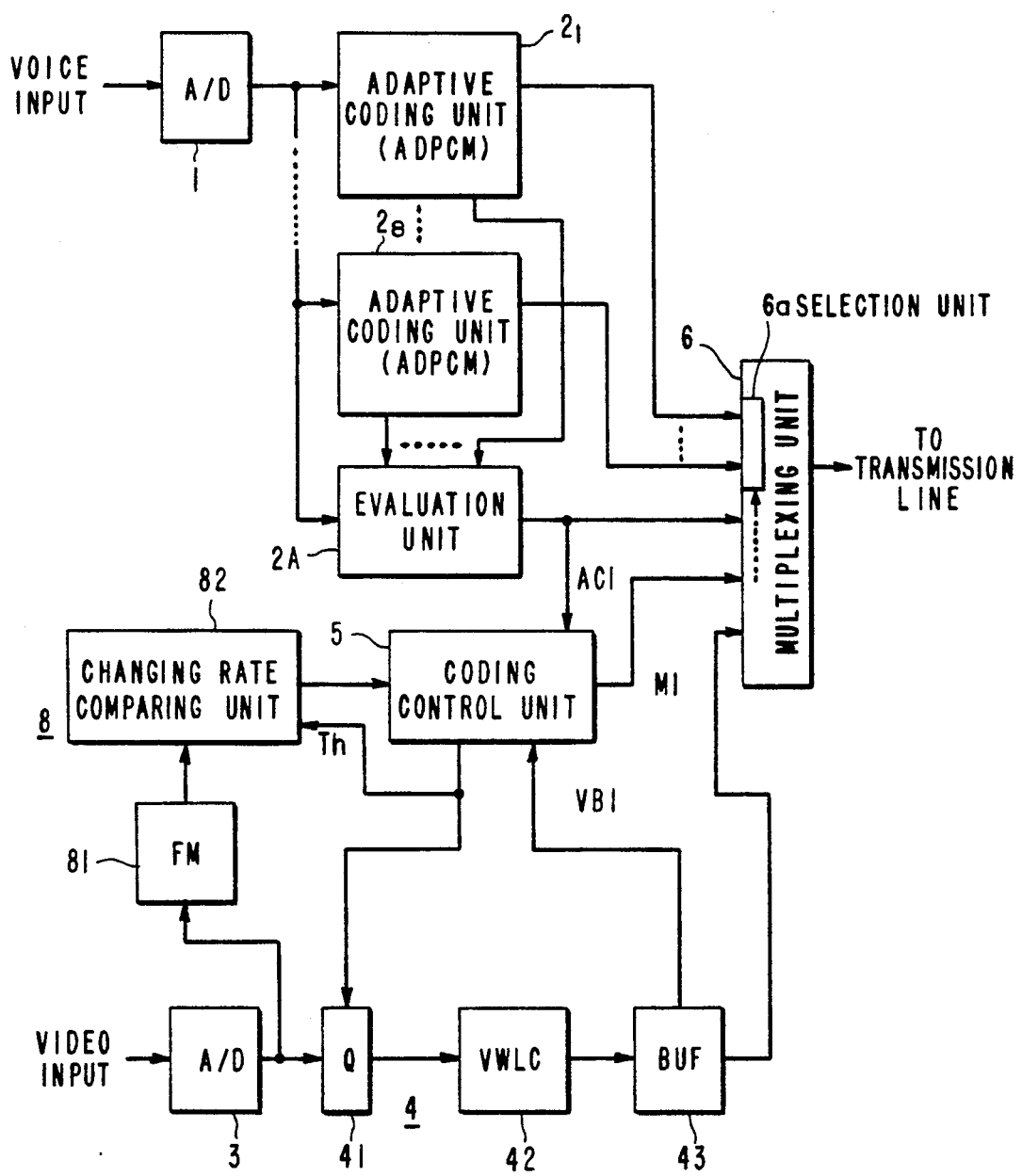
FIG. 29 is a block diagram of the transmitter side of the system shown in FIG. 28.

FIG. 29 is a block diagram of the transmitter side in this embodiment.

The audio coding unit 2 is comprised of eight adaptive coding units (for example ACPCMs) $2_1$ to $2_8$ each with different number of coding bits with respect to the digital sound and an evaluation unit 2A for determining an optimal audio coding bit rate based on a noise evaluation method from the reproduced outputs of the adaptive coding units $2_1$ to $2_8$ and the digital sound and issues an audio bit rate data ACI.

Further, the video coding unit 4 is comprised of a coding unit (Q) 41 for coding the digital picture from the A/D converter 3, a variable length coding unit (VWLC) 42 for coding in variable lengths the coded video data, and a buffer 43 for temporarily storing the variable length coded video data. An interframe rate of change judgment unit 8 is comprised of a frame memory (FM) 81 for storing two frames' worth of the output of the A/D converter 3 and a rate of change comparison unit 82 for comparing this with the threshold value Th from the coding control unit 5 and giving the results of the comparison to the coding control unit 5. Further, the threshold value Th is adjusted by the coding control unit 5 in accordance with the VBI, showing the storage amount of the buffer 43. The selection and multiplexing unit 6 includes a selection unit 6a which receives as input in parallel the coded outputs of the adaptive coding units $2_1$ to $2_8$ and selects the output audio data of the corresponding adaptive coding unit by the video and audio allocation bit rate data MI from the coding control unit 5.

The frame (packet) format of the audio data output from the adaptive coding unit $2_1$ to $2_8$ is as shown in FIG. 8. It comprises a frame header a and a series of audio data following the frame header a and is comprised by the number of bits of the number of coding bits k of the adaptive coding unit receiving the optimal noise evaluation multiplied by the sampling rate n (n=8 kHz).

Examples of the audio frames of 0 to 7 bit coding by these adaptive coding units $2_1$ to $2_8$ are shown in FIG. 9. One of these is selected by the selection unit 6a for the multiplexing.

Figure 30:
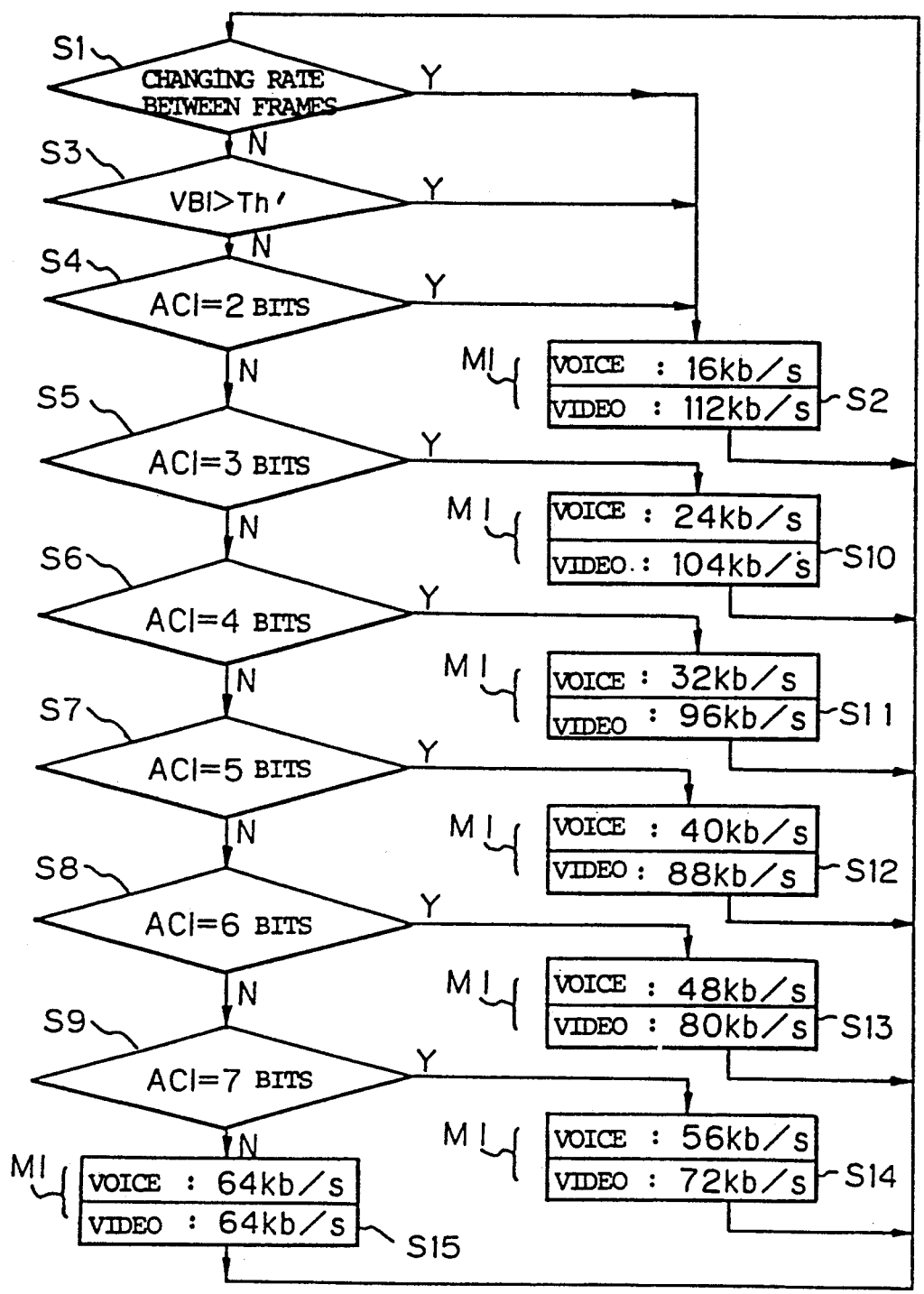
FIG. 30 is a flow chart showing the steps for determining the bit rate by the interframe rate of change of the picture and the optimal audio bit rate.

FIG. 30 shows a control algorithm of a coding control unit 5 for receiving the results of the comparison of the rate of change comparison unit 82 and issuing video and audio allocation bit rate data MI.

In FIG. 30, first, the results of the comparison of the comparison unit 82 are checked whether or not the rate of change of the video data between frames is larger than a threshold value Th (step S1). For example, when participants at a video conference stand up, the video data changes tremendously, and the threshold value Th is exceeded, priority is given to the video data regardless of the video and audio allocation bit rate data MI by, as shown in step 2, producing and outputting video and audio allocation bit rate data for allocating only 2 bits (16 kb/s) (see FIG. 9(3)) to the audio data and allocating 14 bits (112 kb/s) to the video data. Further, the frame composition of 2 bits for video and 14 bits for video = 16 bits is used for the multiplexing operation of the multiplexing unit 6.

On the other hand, the results of the comparison at step S1, if the amount of data stored VBI in the buffer 43 exceeds the threshold value Th' when the rate of change of video data between frames is smaller than the threshold value Th, are checked (step S3). As a result, when the storage data amount VBI is so large that it exceeds the threshold value Th', the control proceeds to step S2 in the same way as above and priority allocation is given to the video data.

When VBI<Th', the video and audio allocation bit rate corresponding to the content of the audio bit rate data ACI from the evaluation unit 2A is determined at the following steps S4 to S15.

That is, when the audio bit rate data ACI indicates 2-bit coding at step S4, the control proceeds to step S2, while when it indicates 3-bit coding, 13 bits (104 kb/s) are allocated for the video data. In this way, the audio bit rate and the video bit rate are decided on and the audio and video allocation bit rate data MI is output to the multiplexing unit 6.

In the above-mentioned embodiment, the transmission ratio was determined from the optimal bit rate for audio data, the interframe rate of change of video data, and the storage amount of the buffer, but the decision may also be made by just one type of data and further use may be made of other data relating to the video data and audio data, for example, the intraframe rate of change of video data and the high frequency ratio of the audio data.

The next embodiment uses an SB-ADPCM (sub-band ADPCM) as the audio coding unit 2. The SB-ADPCM is of a type which codes data by dividing it into two frequency bands and allocates higher order bits of a greater number (for example, 6 bits in 8 bits) to a low frequency portion with a high data density and lower order bits of a smaller number (2 bits) to the high frequency band with a low data density. Therefore, it is possible to round off data from the lower order and it is possible to use the allocation rates adaptively (6, 7, and 8 bits). As shown in principle in FIG. 31, the transmitter side is provided with an A/D converter 1 for converting the audio input to digital sound, an SB-ADPCM coding unit 2 for coding the digital sound divided into a low frequency bit portion and a high frequency bit portion, an A/D converter 3 for converting the video input to a digital picture, a video coding unit 41 for coding said digital picture, a variable length coding unit 42 for coding in variable lengths the said coded video data, a buffer 43 for storing temporarily said variable length coded video data, and a buffer judgment unit 44 for determining an audio allocation rate in accordance with an amount of data stored in the buffer 43, and a multiplexing unit 6 for allocating a part of the video data to the high frequency bit portion of the SB-ADPCM coding unit 2 in accordance with the allocation bit rate and multiplexing the allocation rate data, video data, and audio data.

Further, the receiver side is provided with a demultiplexing unit 11 for demultiplexing the multiplexed signal from the transmission line 10 into audio data, video data, and allocation data, a D/A converter 13 for converting the SB-ADPCM coded digital sound to an audio signal, a buffer 143 for temporarily storing the video data, a variable length decoding unit 142 for decoding in variable lengths the video data of the buffer 143, an inverse coding unit 141 for inverse coding of the variable length decoded video data and issuing a digital video signal, a D/A converter 15 for converting the digital video output to video output, and a decoding control unit 16 for controlling the audio decoding unit 12 in accordance with the allocation rate.

Figure 31:
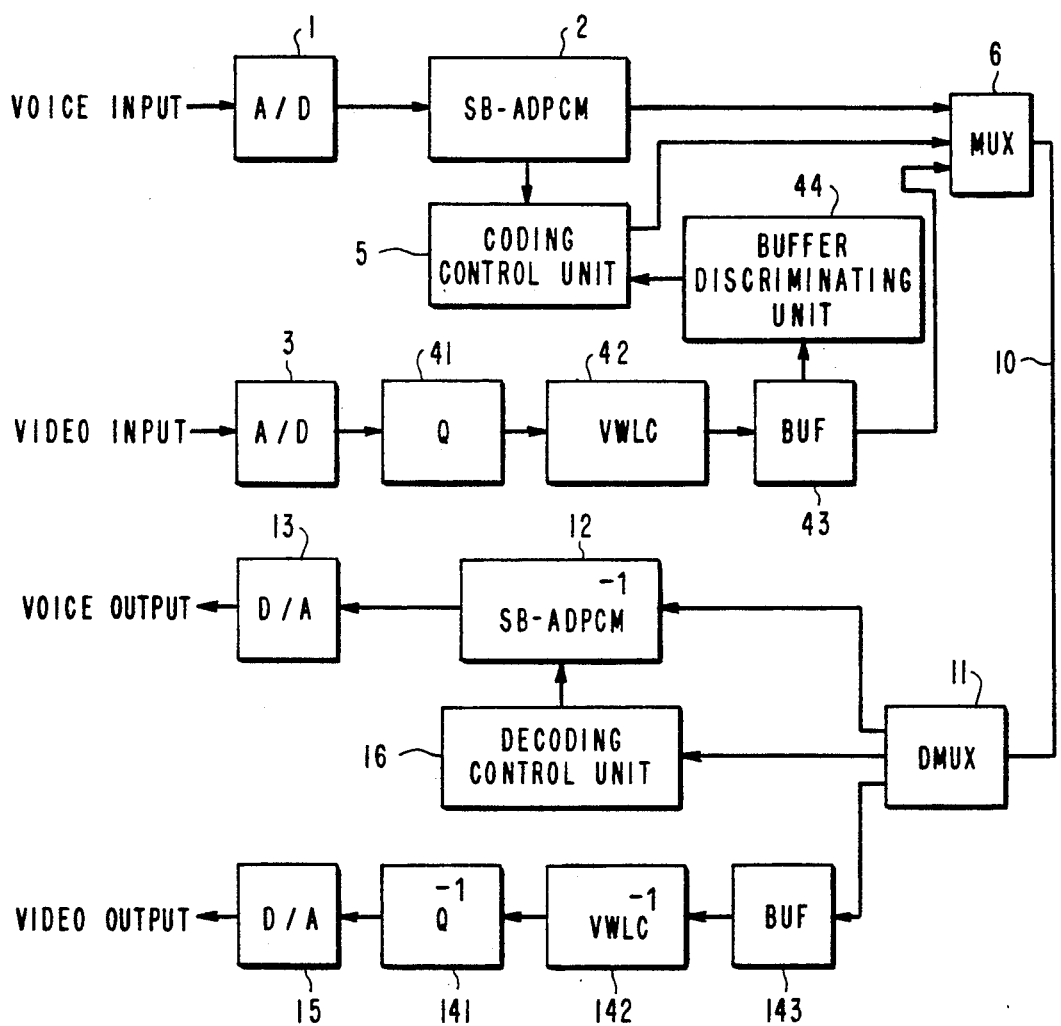
FIG. 31 shows the basic constitution of another embodiment.

At the transmitter side of FIG. 31, the video input is converted to a digital signal by the A/D converter 3, subjected to filtering, then led to the coding unit where the data of the prior frame is used for compression of the amount of data, the value obtained there then being quantified. This quantified data is processed by the variable length coding unit (VWLC) 42 so that short codes are allocated for data with high frequencies of occurrence and long codes are allocated for data with low frequencies of occurrence. The coded data is stored temporarily in the buffer (BUF) 43.

The data of the buffer 43 is multiplied and sent out by the multiplexing unit (MUX) 6. When the capacity of the transmission line is small, the amount of data stored in the buffer 43 increases and when the capacity of the transmission line is large, the amount of data stored becomes smaller.

Therefore, it is possible to obtain a grasp of the amount of data transmitted to the transmission line by the amount of data stored in the buffer 43. This data may be sent to the buffer judgment unit 44, and the buffer judgment unit 44 may determine the allocation (coding) rate of the audio data based on the data on the amount of data.

The audio input is converted to digital sound by the A/D converter 1 and sent to the SB-ADPCM coding unit 2.

Therefore, the allocation rate decided on at the buffer judgment unit 44 is used for selection of the coding output of the SB-ADPCM 2, the required number of audio bits are cut away, video data is allocated to the cutaway portion, and the audio data, video data, and allocation rate data are multiplexed by the multiplexing unit (MUX) 6 and transmitted.

On the other hand, at the receiver side, the demultiplexing unit (DMUX) 11 demultiplexes the signal to video data, audio data, and allocation rate data.

In this way, the amount of audio data can be changed in accordance with changes in the amount of video data in the same way as shown in FIG. 26 and FIG. 27 and a more superior quality of video data can be transmitted.

Figures 32, 33:
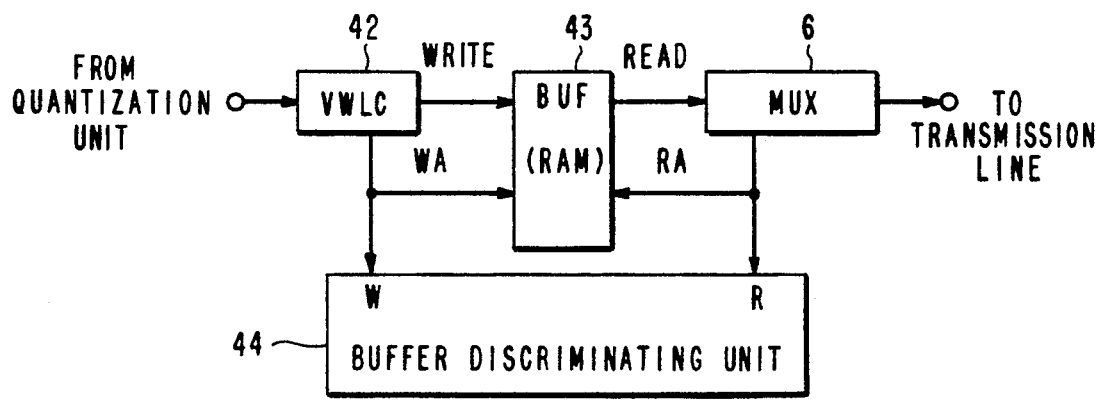
FIG. 32 is an explanatory view of the buffer judgment portion of the system shown in FIG. 31.
FIG. 33 shows an example of a bit array of FAS data.

FIG. 32 shows an embodiment of the buffer judgment unit 44 shown in FIG. 31. This embodiment receives as input the writing address W to the buffer 43 comprised of a RAM from the variable length coding unit 42 and the reading address R to the buffer 43 from the multiplexing unit 6 and performs the following judgment.

① When $W-R<$ threshold value $Th_1$, since there is no progress in the reading of data with respect to the writing of data to the buffer 43, it is judged that the amount of video data generated is large, and data (0, 1) is sent to the multiplexing unit 6 relating to the allocation rate for cutting away the 2 bits allocated to the high frequency component in the 8 bit audio coding data from the SB-ADPCM coding unit 2 and coding only the 6 bits of audio data allocated to the low frequency component.

② When the threshold value $Th_2>W-R>$ threshold value $Th_1$, it is judged that the amount of video data generated is medium and data (0, 1) is sent to the multiplexing unit 6 relating to the allocation rate for cutting away the 1 bit in the 2 bits allocated to the high frequency component in the 8 bits of audio coding data from the SB-ADPCM coding unit 2 and coding only the remaining bit and the 6 bits allocated to the low frequency component, a total of 7 bits.

③ When the threshold value $Th_2>W-R$, it is judged that the amount of video data generated is small, and data (0,1) is sent to the multiplexing unit 6 relating to an allocation rate for coding, without cutting, the 8 bit audio coding data from the SB-ADPCM coding unit 2.

An example of the bit arrangement of FAS data is shown in FIG. 33. The frame synchronization (1) is performed by recognition of the FAW (frame alignment word) (in FIG. 33, "0011011"), while the multiframe synchronization (2) is performed by discrimination by the data Mi arranged at the first bit of the FAS data, noting the data Mi of the first, third, fifth, seventh, ninth, and 11th frames, and synchronizing by the pattern of "001011".

FIG. 34 shows an example of the BAS data. This BAS data is produced by setting the ratio between the amount of the audio data and the amount of the video data based on the above allocation rate at the transmitter side (see FIG. 12). It is data used for the demultiplexing of data at the receiver side after the frame synchronization. The units of change of processing of the data demultiplexing is each one multiframe or one sub-multiframe (1 multiframe=2 sub-multiframes). The BAS data is judged every 1 sub-multiframe. As shown in FIG. 12, it becomes possible to recognize the demultiplexing position of the audio/video data in the next multiframe or sub-multiframe at the point of time when the change in the BAS data is recognized by the majority decision at the demultiplexing unit 11 (where five or more frames match in the eight frames). This is to determine which BAS data in a frame should be relied on, since the BAS data also changes at the point of time when the audio-video ratio changes. Further, the demultiplexing unit of the audio/video data is in 80 bit units.

Figure 35:
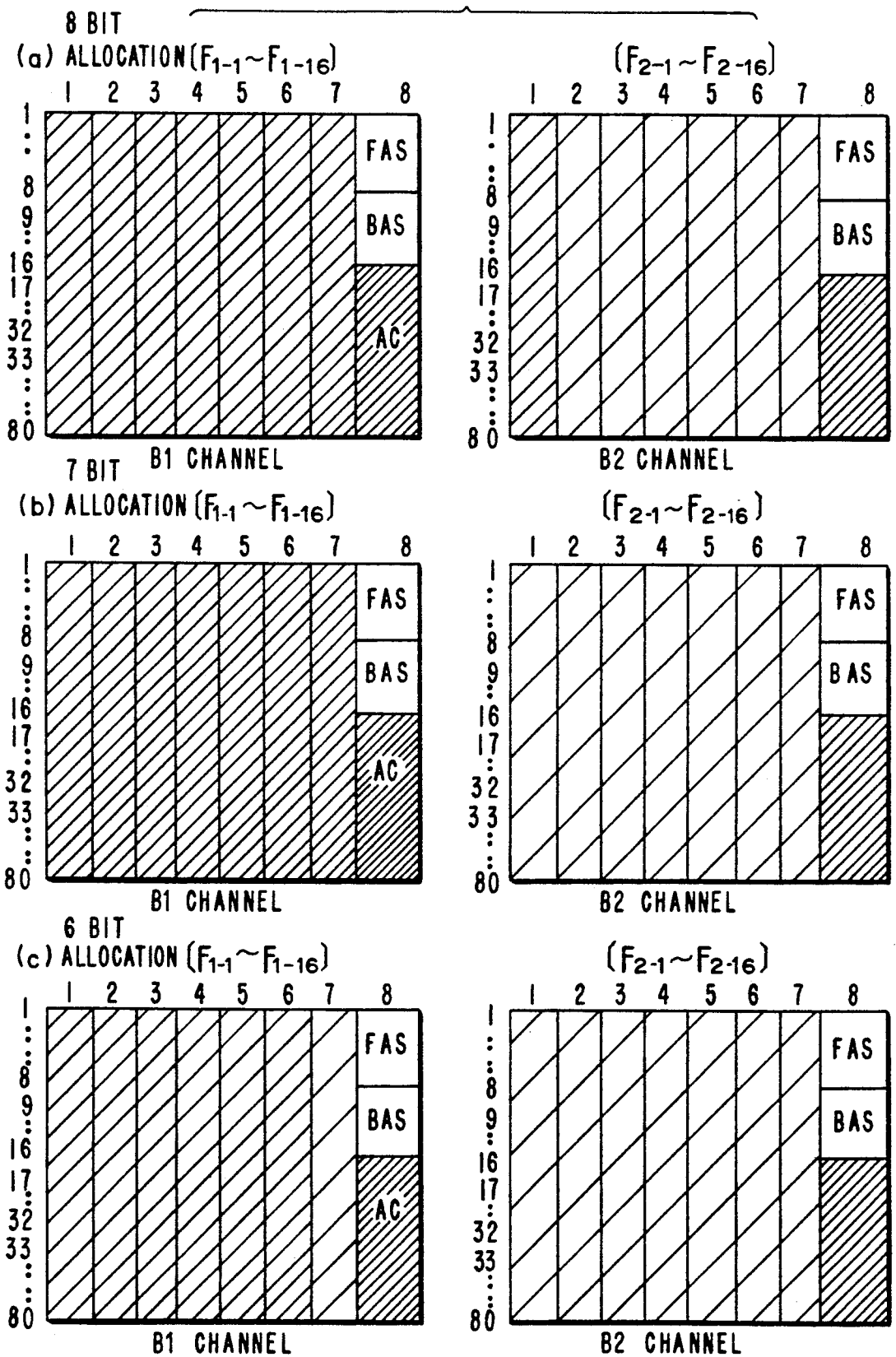
FIG. 35 is a view of the frame format showing an example of the allocation bits of sound.

Next, explaining the operation, the multiplexing unit 6 using the above frame format decides on the bit arrangement using the BAS data based on the allocation rate data output from the coding control unit 5, as shown in FIG. 35, from the CPU 21, divided into the case of use of the 8 bits of audio data as they are ((a) in figure), the case of discarding 1 bit and using 7 bits ((b) in the figure), and the case of discarding 2 bits and using only the 6 bits of the low frequency component ((c) in the figure) and stores the audio data and video data in the RAM 27.

Next, the data is sent to the transmission line at a rate matching the transmission speed at the point of time when the frame format of FIG. 35 is completed.

Therefore, the transmission speeds according to the various bit allocations per frame of the audio data in FIG. 35 are as follows:

(a) $6\times 80$ (480 bits)$\times 100$ frames (1 second)$=48$ kb/s
(b) $7\times 80$ (560 bits)$\times 100$ frames (1 second)$=56$ kb/s
(c) $8\times 80$ (640 bits)$\times 100$ frames (1 second)$=64$ kb/s On the other hand, the demultiplexing unit 11 at the receiver side has the same construction as the multiplexing unit 6 shown in FIG. 10 except the arrows are in the reverse direction.

That is, (1) Y.221 frame synchronization and (2) multi-frame synchronization are established for input data from the transmission line, as mentioned before, by analyzing the FAS data. Then, the data is demultiplexed by the demultiplexing unit 11 based on BAS data and the demultiplexed data are sent through the interfaces, with the audio data going to the SB-ADPCM decoding unit 12 and the video data being sent to the buffer 143 and the variable length decoding unit 142.

Here, the demultiplexed audio data must output the data in accordance with the number of audio allocation bits as shown in FIG. 36 at a timing synchronized with the transmission line clock (8 kHz, 64 kHz), so the audio data is decoded by the SB-ADPCM decoding unit 12 based on the above allocation rate data contained in the BAS data and output as an analog signal by the D/A converter 13. Further, the video data is decoded from the buffer 143 by the variable length decoding unit 142, decoded by the video decoding unit 141, and converted to an analog video signal by the D/A converter 15 and output.

In the above explanation, it is possible to use the ADPCM-MQ system or SB-ADPCM system as the adaptive audio coding unit, but there are also the DPCM system, APC-AB system, and other systems of adaptive audio coding units. It is necessary to confirm the coincidence/noncoincidence of the transmission and reception systems between the transmitter side and receiver side.

Figures 37, 38:
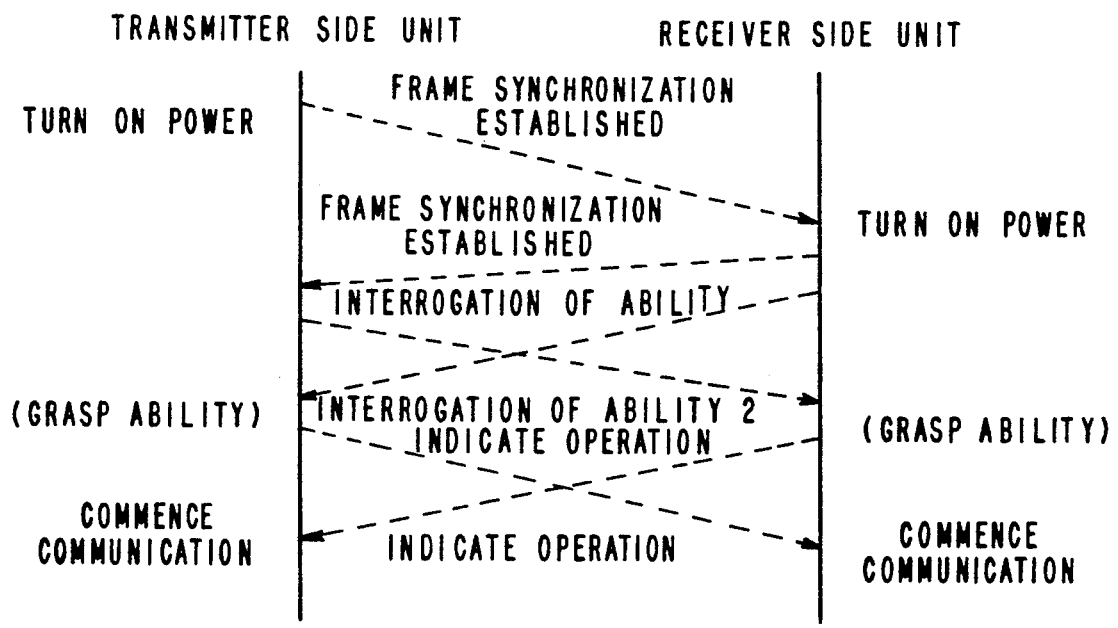
FIG. 37 is a view showing the in-channel connection protocol.
FIG. 38 is a view showing an example of additional bits for inquiring about capacity in the AC data.

Therefore, to obtain a grasp of the mutual capacities of the apparatuses and find a common operational mode, use may be made of the ICP (in-channel connection protocol) procedure as shown in FIG. 37, wherein ① The power is turned on, then the FAS data is used for frame synchronization.

② As shown in FIG. 38, the mutual capacities, that is, the coding systems, are inquired about by 8 bits in the 64 bits of AC data.

③ The common coding system based on the results of the inquiry is designated using the BAS data. (However, when there is no common system, the procedure is executed for communication using a fixed coding rate.)

In this way, automatic connection is performed and it is possible to avoid competition with the conventional apparatus.

Next, an explanation will be made of an embodiment for correction the deviation between the audio output and video output arising due to the difference between the processing speeds of audio and video coding and decoding.

Figure 39:
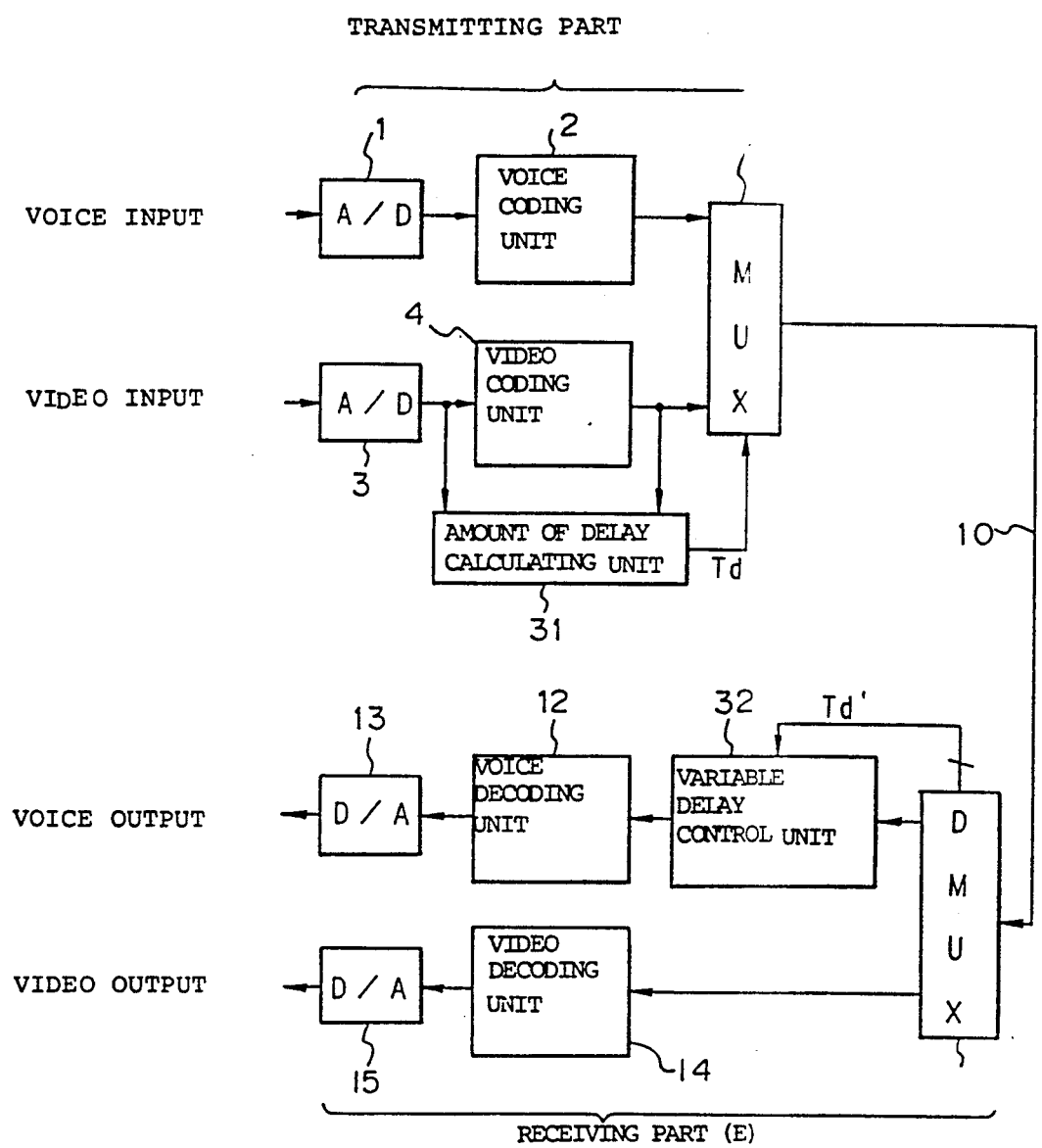
FIG. 39 shows the basic constitution of another embodiment.

As shown in principle in FIG. 39, the system is comprised of a transmission unit D and a reception unit E. The transmitter side is provided with an A/D converter 1 for converting audio input to digital sound, an audio coding unit 2 for coding the digital sound, an A/D converter 3 for converting the video input to a digital picture, a video coding unit 4 for coding the digital picture, a delay amount calculation unit 31 for generating a video coding delay time data for synchronizing the video reproduced output and the audio reproduced output from input-output data of the video coding unit 4, and a multiplexing unit 6 for multiplexing the coded video data, audio data, and delay time data.

Further, the receiver side is provided with a demultiplexing unit 11 for demultiplexing the multiplexed signal from the transmission line 10 into audio data, video data, and delay time data, a variable delay control unit 32 for delaying the audio data in accordance with the delay time data, an audio decoding unit 12 for decoding the audio data from the variable delay control unit 32, a D/A converter 13 for converting the decoded digital sound to an audio signal, a video decoding unit 14 for decoding the video data, and a D/A converter 15 for converting the decoded digital video output to video output.

As shown in FIG. 39, the fixed processing delay time (Ta: fixed amount) obtained by subtracting the fixed processing delay time at the decoding unit 14 of the video signal from the fixed processing delay time at the decoding unit 2 and the decoding unit 12 of the audio signal is shorter than the delay time (Tv: variable amount) required for the coding processing at the coding unit 4 of the video signal, so the delay time (Td: variable) required for the variable delay control unit 32 so that the audio decoding unit 12 and the video decoding unit 14 simultaneously generate outputs is given by Td=Tv−Ta.

Therefore, the delay data Td can be found by finding Tv, since Ta is constant.

Figure 40:
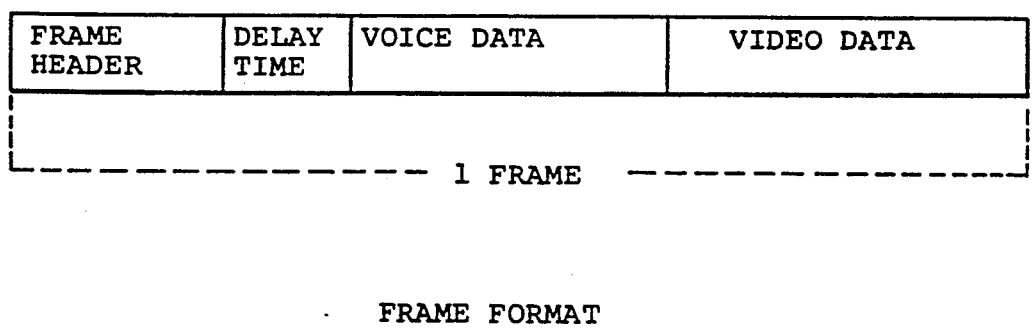
FIG. 40 shows the concept of the frame data used in the system shown in FIG. 39.

Therefore, in the present invention, the delay amount calculation unit 31 calculates the delay time Tv for the coding processing based on the input-output data of the video coding unit 4 and gives to the multiplexing unit 6 data relating to the above delay time Td from this delay time Tv and the previously known constant delay time Ta. This delay time data is multiplexed and transmitted with the video data and audio data (see FIG. 40).

On the other hand, at the receiver side, the delay time data is demultiplexed by the demultiplexing unit 11 and given to the variable delay control unit 32, whereupon the variable delay control unit 32 delays the demultiplexed audio data by exactly the delay time Td and gives it to the audio decoding unit 12.

In this way, adaptive delay control is performed in accordance with the input picture, so it is possible to output in a matched format the audio decoded output and the video decoded output.

Figure 41:
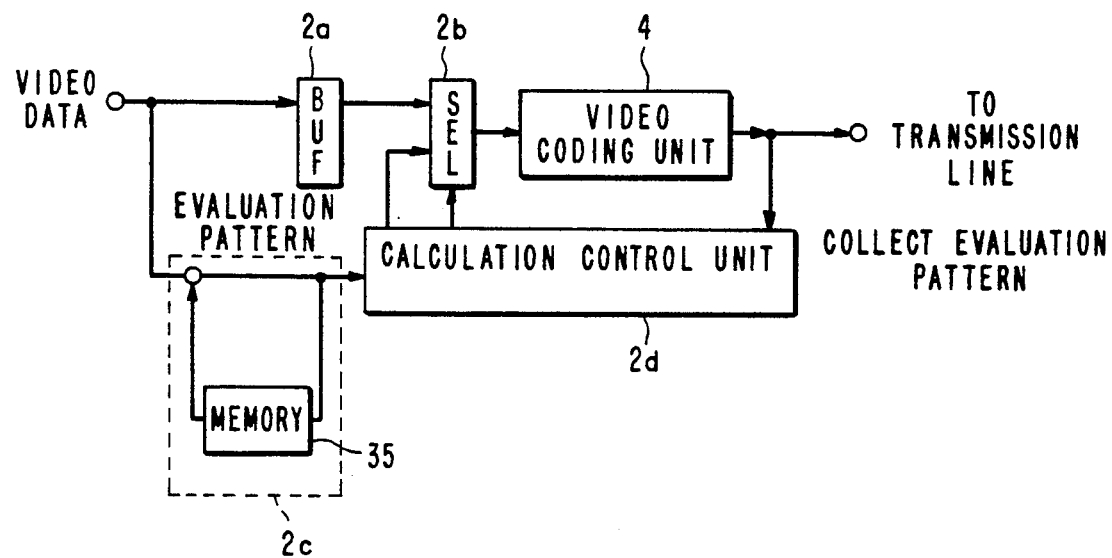
FIG. 41 is a block diagram showing an embodiment of the delay amount calculation unit of the system shown in FIG. 39.

FIG. 41 shows an embodiment of the delay amount calculation unit 31 shown in FIG. 39. In this embodiment, this includes a buffer (BUF) 2a for storing audio data from the A/D converter 1, a selector (SEL) 2b for selecting the video data or evaluation pattern from the buffer 2a based on the select signal, a video data amount detection unit 2c for detecting the amount of video data using the memory 35, and a calculation control unit 2d for receiving the above amount of video data, issuing an evaluation pattern and select signal, and receiving an evaluation pattern from the video coding unit 4.

In the operation, the calculation control unit 2d shifts to the sequence for calculation of the processing delay time $T_{vc}$ of the video coding unit 4 in the case when the difference between temporally adjoining amounts of video data becomes more than a certain threshold value (Th) based on the change of the output of the video data amount detection unit 2c, for example.

During this calculation, the select signal is given to the selector 2b from the calculation control unit 2d, so the selector 2b switches from the video data of the buffer 2a to the evaluation pattern, the evaluation pattern is output, and the pattern is sent from the selector 2b to the video coding unit 4.

Next, the time from when the evaluation pattern is sent to when the evaluation pattern is output from the coding unit 4 is calculated so as to calculate the processing delay time $T_{vc}$.

Further, the evaluation pattern used is made a pattern which does not exist in the video data. Also, when the evaluation pattern is input at the coding unit 4, it is output in the unprocessed state, so as an embodiment, use is made of the evaluation pattern "00000000000000".

Further, during the transmission of the evaluation pattern, the video data is stored in the buffer 2a and readout is prohibited, so the video data will never be discarded.

Using the delay time $T_{vc}$ calculated in the above way, the calculation control unit 2d finds the delay time Td for obtaining synchronization. This is found from $$Td = T_{vc} + T_{vd} - T_{ac} - T_{ad}$$

Here, $T_{vd}$ is the video decoding delay time, $T_{ac}$ is the audio coding delay time, and $T_{ad}$ is the audio decoding delay time. Ta=$T_{vd}-T_{ac}-T_{ad}$ may be considered to be constant compared with the video coding delay time $T_{vc}$, so by finding Ta in advance, it is possible to obtain the delay time Td and send it to the multiplexing unit 6.

FIG. 42 shows an embodiment of the multiplexing unit 6. In this embodiment, it is comprised of a CPU 21, a CPU bus 22, a ROM 23 storing programs for transmitting data to the transmission line in the frame format shown in FIG. 2, interfaces (I/F) 24 to 26 for fetching to the bus 22 the video data, audio data, and delay time data from the delay amount calculation unit 31, a RAM 27 having address space for temporarily writing in video data, audio data, and delay data from the interfaces 24 to 26, and an interface 28 for transmitting the data to the transmission line.

The transmission frame format is as shown in FIG. 2. As shown in FIG. 6, the FAS data is frame data which is used for establishing synchronization by the synchronization procedure of (1) Y.221 frame synchronization and (2) multiframe synchronization. That is, frame units can be distinguished by the above (1), and frames can be differentiated by (2). It is necessary to differentiate all the frames so as to recognize the units of response to changes in the BAS (bit allocation signal) data.

The BAS data sets in advance at the transmitter side the coding data (for example, the ratio) of the amount of audio data and the amount of video data. It is used at the receiver side after the frame synchronization for demultiplexing of the data. This BAS data is judged for every sub-multiframe (1 multiframe = 2 sub-multiframes).

Figure 43:
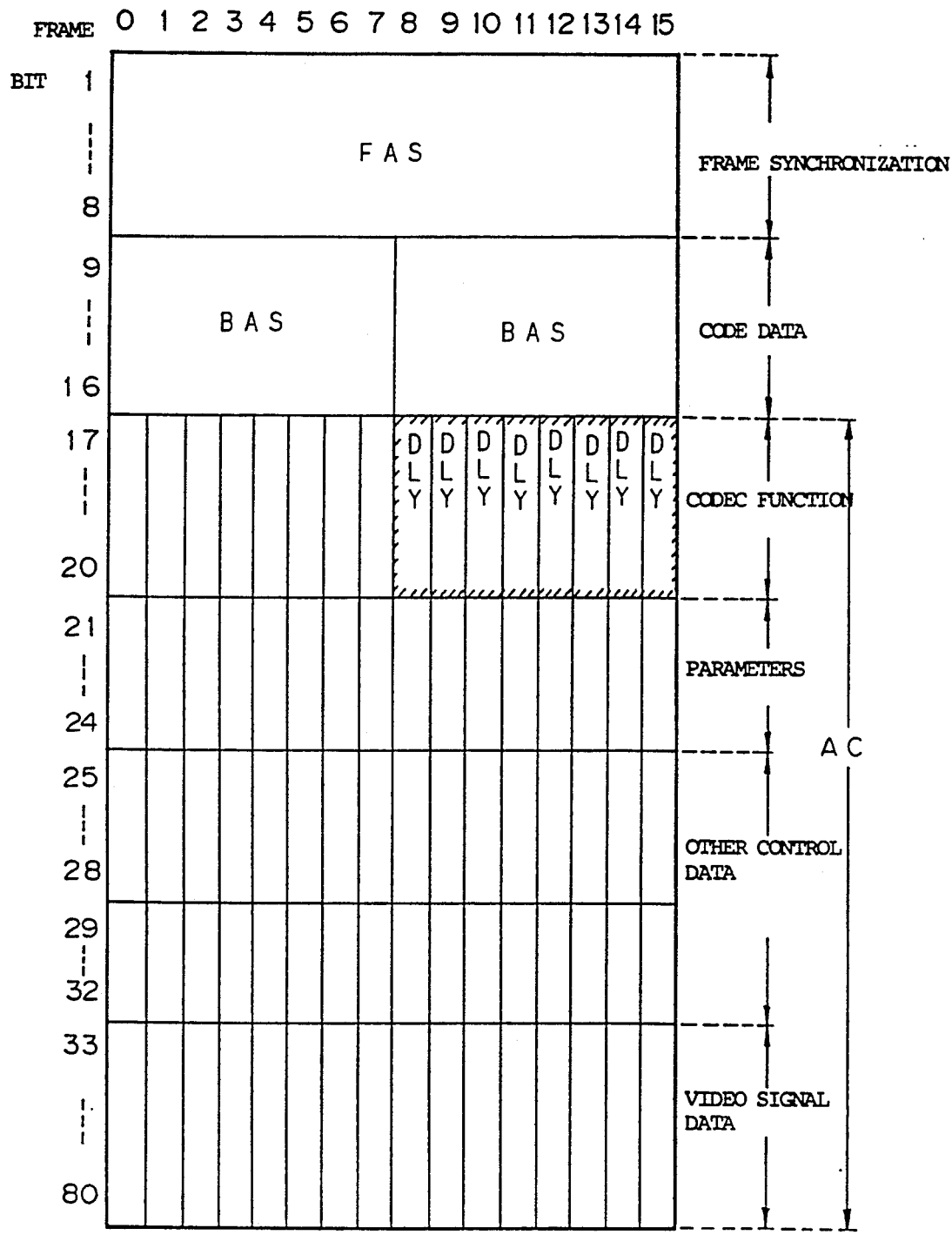
FIG. 43 is a view showing the control data in the frame format of the system shown in FIG. 39.

Further, the delay time data from the delay amount calculation unit 31 indicates the data relating to the delay time Td, mentioned above, by the use of 8 frames of DLY0 to 7 (CODEC function unit) for the control data (AC data) unit shown in FIG. 43. These 8 bits enable 256 types of audio delay data to be sent to the receiver side apparatus.

Next, explaining the operation, the multiplexing unit 6, in the case of use of the above frame format, decides on the bit arrangement in accordance with the BAS data stored in advance in the CPU 21, then stores the audio data and video data in the RAM 27. Next, at that time, the delay time data found by the delay amount calculation unit 31 is stored as the control data. After this, the data is sent to the transmission line 10 at a rate matching the transmission speed at the time when the frame format is completed.

On the other hand, the demultiplexing unit 11 at the receiver side has the same construction as the multiplexing unit 6 shown in FIG. 42 but with the arrows in the reverse direction.

That is, (1) Y.221 frame synchronization and (2) multi-frame synchronization are established for the input data from the transmission line, as mentioned before, by analyzing the FAS data. Then, the data is demultiplexed by the demultiplexing unit 11 based on BAS data and the demultiplexed data are sent through the interfaces, with the audio data going to the variable delay control unit 32 and the video data going to the video decoding unit 14. Further, the delay time data in the control data is similarly demultiplexed and sent to the variable delay control unit 32.

The variable delay control unit 32 receives the delay time data demultiplexed by the demultiplexing unit 11, delays the audio data by the delay time Td, and sends it to the audio decoding unit 12.

As another method for determining the delay time, it is possible to prepare various types of delay tables in advance, as shown below, and to select the most appropriate value in accordance with the amount of video data generated and use it as the video coding delay time $T_{vc}$.

<Example of Table>

① Coding in frame: $T_{vc}$ = 500 msec

-continued

<Example of Table>

② Coding between frames
   (1) Large amount of data generated: $T_{vc}$ = 250 msec
   (2) Large amount of data generated: $T_{vc}$ = 200 msec
   (3) Large amount of data generated: $T_{vc}$ = 150 msec Times other than the variable delay time $T_v$ of the video coding processing were prepared in advance in the delay amount calculation unit 31 on the transmitter side as the fixed delay times, but it is also possible to provide a delay amount calculation unit on the receiver side and find the desired delay time Td there.

In the above way, when changing the transmission ratio by the content of the video data and audio data, the deviation becomes smaller, but even so remains to some extent. Therefore, after changing the transmission ratio of the video and audio data, one may perform reproduction by giving a delay time corresponding to the input data so as to maintain a good balance between the picture and sound.

Next, an explanation will be made of the case of use of a delay time for the picture with respect to the sound so as to compress the silent portion of the sound and transmit for a time corresponding to the delay time.

FIG. 44 shows the basic constitution of this embodiment. The symbol A in the figure indicates the terminal office, 3 the A/D converter for the video signal, 41 a video coding unit, 42 a variable length coding unit, 1 an A/D converter for the audio signal, 2 an audio coding unit, 6 and 11 multiplexing and demultiplexing units, 9 a transmission line interface unit, 142 a variable length decoding unit for the video signal, 141 a video decoding unit, 15 a D/A converter, 12 an audio decoding unit, 13 a D/A converter, 19 a system control unit, 71 a time division coding unit, and 72 a time division decoding unit.

The video signal is subjected to predictive coding processing at the video coding unit 41, then subjected to variable length coding processing and supplied to the multiplexing and demultiplexing units 6 and 11. On the other hand, the audio signal is coded to the 4 kHz band 16 kbps or 7 kHz band 56 kbps at the audio coding unit 2, then the silent period in the audio signal is removed and the signal of only the valid period is extracted. This is assembled into a packet and then a portions worth of a period substantially corresponding to the desired delay control amount T is assembled and supplied to the multiplexing and demultiplexing units 6 and 11.

Next, the video data and the audio data are multiplexed and are sent from the transmission line interface unit 68 to the opposing terminal office.

The signal received from the opposing erminal office is demultiplexed into a video signal and audio signal by the multiplexing and demultiplexing units 6 and 11. The video signal passes through the variable length decoding unit 142, the video decoding unit 141, and the D/A converter 15 and is received as the video output. The audio signal passes through the time division decoding unit 72, the audio decoding unit 12, and the D/A converter 13 and is received as the audio output.

The time division coding unit 71 extracts the signal of the effective period of the audio signal, that is, the period minus the silent period, based on the output from the audio coding unit 2, assembles it in a packet, assembles what has been assembled in a portion's worth of a time suitable for the above-mentioned delay control amount T, and supplies it to the multiplexing and demultiplexing units 6 and 11 in, for example, 8 kbps units in a minimum of 0 to a maximum of 7 units (56 kbps). Next, the time division coding unit 71 notifies the system control unit 19 and the multiplexing and demultiplexing units 6 and 11 at which of the audio transmission speeds of 0 kbps to 56 kbps it has output.

Based on this notification, the system control unit 19 changes the threshold value (second threshold value) for controlling the coding processing in the video coding unit 41 based on the amount of data in the buffer memory in the variable length coding unit 42. That is, the amount of transmission of the video signal increases along with the reduction in the amount of transmission of the audio signal.

On the other hand, the multiplexing and demultiplexing units 6 and 11 fetch the transmission speed of the audio signal and describe in the frame data the data for notifying the opposing terminal station of the transmission speed of the audio signal in the multiplexed frame format.

FIG. 45(A) shows the transmission frame format in the case of the embodiment and FIG. 45(B) explains the component frame data.

8 kbps is allocated for the frame data. The frame data includes a frame header and has component frame data for notifying the opposing terminal office of the audio transmission speed. The component frame data, as shown in FIG. 45(B), is assembled in the range of 0 kbps to 56 kbps in the time division coding unit 41. The audio transmission speed supplied to the multiplexing and demultiplexing units 6 and 11 is described in the form of the data "000" to "111".

In the case of the present invention, one of the portions from the minimum 0 kbps to 56 kbps is allocated and sent as the portion for transmitting the audio signal as shown by "variable" in FIG. 45(A), corresponding to the above-mentioned audio transmission speed. If a kbps is given for the audio signal, the remaining illustrated (56 - a) kbps is used for transmitting the video signal.

FIG. 46 shows the mode of processing in the time division coding unit.

When an audio input ① is given as illustrated, it is digitalized by the A/D converter 1 shown in FIG. 44 and becomes the A/D output ②. Note that "1", "2", and "3" in the figure are signals during the effective period. The A/D output ② has silent periods cut away as illustrated and is assembled as the illustrated packet output ③.

The packet output ③, as shown by the illustrated packet data ④, is produced like the illustrated (A), (B), (C) . . . for each predetermined time $t_s$. This data (A), (B), (C) . . . is assembled during the time corresponding to the above-mentioned delay control amount T and is supplied to the multiplexing and demultiplexing units 6 and 11 as 0 to 7 bits using 8 kbps as one unit, as shown in the input data ⑤ to the multiplexing and demultiplexing units. The above-mentioned audio transmission speed is given depending on how many bits of data (A), (B), (C) . . . were assembled. That is, in the case of 0 bit, the "000" shown in FIG. 45(B) is produced, in the case of 1 bit, "001" is produced, . . . and in the case of 7 bits, "111" is produced.

FIG. 47 shows the mode of feedback control in the case of the present invention.

The audio transmission speed produced in the time division coding unit 41 (illustrated coding speed) is supplied to the system control unit 19 as the second threshold value such as the threshold value 2' in the case of the present invention. Note that the first threshold value is given by a fixed value in the same way as in the prior art.

The system control unit 19 changes the conditions for commanding the video coding unit 41 to stop the coding processing, as shown in FIG. 47(b), based on the audio transmission speed (coding speed). Alternatively, it changes the table of quantification. That is, it commands the above-mentioned stopping in the case where the greater the audio transmission speed, the smaller the data stored in the buffer memory 43. Or else, it changes the table of quantification to a rougher one. Of course, conversely, the above stopping is commanded in the state where the smaller the audio transmission speed, the greater the data stored in the buffer memory 43. Alternatively, the table of quantification may be made a finer one.

The illustrated "control A" is a control signal for the video coding unit 3, while the illustrated "control B" is a control signal for notifying the multiplexing and demultiplexing units 6 and 11 of the audio transmission speed.

CAPABILITY OF EXPLOITATION IN INDUSTRY

The present invention is used in video conference etc. using video and audio multiplex transmission systems, so is more effective for relatively lower grade systems which cannot be said to be sufficient in terms of transmission capacity, but can be applied as well to cases of large transmission capacities.

We claim:

1. A video and audio multiplex transmission system having a transmission unit connectable to receive an audio input and a video input and to transmit a multiplexed signal, comprising:
   an audio A/D converter connected to convert the audio input to a digital sound signal,
   an audio coding unit for coding the digital sound signal, for outputting coded sound data having a format that enables selection of a transmission amount and for outputting audio content data,
   a video A/D converter connected to convert the video input to a digital picture signal,
   a video coding unit for coding the digital picture signal and for outputting coded picture data,
   a coding control unit for determining and outputting control data including an allocation signal indicative of a transmission ratio of the coded sound signal and the coded video data in accordance with the transmission amount of at least one of the coded sound data and the coded picture data, and
   a multiplexing unit for multiplexing the coded sound data and the coded picture data based on the allocation signal so as to obtain a certain transmission frame length, and
   wherein said audio coding unit comprises an SB-ADPCM coding unit which divides the digital sound signal into a low frequency bit portion and a high frequency bit portion for coding and selects an amount of allocation of the high frequency bit portion based on the allocation signal.

2. A video and audio multiplex transmission system according to claim 1, wherein said audio coding unit is an adaptive type which outputs a plurality of coded sounds with different coding bit rates and wherein one of the plurality of coded sounds is selected based on an allocation bit rate output as the allocation signal.

3. A video and audio multiplex transmission system according to claim 2, wherein said audio coding unit outputs an optimal audio bit rate signal.

4. A video and audio multiplex transmission system according to claim 3, wherein said coding control unit outputs the optimal audio bit rate signal as the allocation signal.

5. A video and audio multiplex transmission system according to claim 1, wherein said transmission unit further comprises an interframe rate of change judgment unit which finds a rate of change of interframe data of the digital picture signal, compares it with a threshold value, and outputs an interframe rate of change signal based on the comparison.

6. A video and audio multiplex transmission system according to claim 2, wherein said transmission unit further comprises an interframe rate of change judgment unit which finds a rate of change of interframe data of the digital picture signal, compares it with a threshold value, and outputs an interframe rate of change signal based on the comparison.

7. A video and audio multiplex transmission system according to claim 3, wherein said transmission unit further comprises an interframe rate of change judgment unit which finds a rate of change of interframe data of the digital picture signal, compares it with a threshold value, and outputs an interframe rate of change signal based on the comparison.

8. A video and audio multiplex transmission system according to claim 1, wherein said transmission unit further comprises an interframe rate of change judgment unit which finds a rate of change of interframe data of said digital picture, compares it with a threshold value, and outputs an interframe rate of change signal based on the comparison.

9. A video and audio multiplex transmission system according to claim 1, wherein said video coding unit comprises:
  a video coding unit for coding the digital picture signal to produce the coded picture data,
  a variable length coding unit for coding in variable lengths the coded video data to produce variable length coded picture data,
  a buffer for temporarily storing the variable length coded video data, and
  a buffer judgment unit for outputting a storage amount signal in accordance with an amount of the variable length coded picture data stored in said buffer.

10. A video and audio multiplex transmission system according to claim 2, wherein said video coding unit comprises:
  a video coding unit for coding the digital picture signal to produce the coded picture data,
  a variable length coding unit for coding in variable lengths the coded video data to produce variable length coded picture data,
  a buffer for temporarily storing the variable length coded video data, and
  a buffer judgment unit for outputting a storage amount signal in accordance with an amount of the variable length coded picture data stored in said buffer.

11. A video and audio multiplex transmission system according to claim 3, wherein said video coding unit comprises:
  a video coding unit for coding the digital picture signal to produce the coded picture data,
  a variable length coding unit for coding invariable lengths of the coded picture data to produce variable length coded picture data,
  a buffer for temporarily storing the variable length coded video data, and
  a buffer judgment unit for outputting a storage amount signal in accordance with an amount of the variable length coded picture data stored in said buffer.

12. A video and audio multiplex transmission system according to claim 1, wherein said video coding unit comprises:
  a video coding unit for coding the digital picture signal to produce the coded picture data,
  a variable length coding unit for coding in variable lengths the coded picture data to produce variable length coded picture data,
  a buffer for temporarily storing the variable length coded video data, and
  a buffer judgment unit for outputting a storage amount signal in accordance with an amount of the variable length coded picture data stored in said buffer.

13. A video and audio multiplex transmission system according to claim 7, wherein said video coding unit comprises:
  a video coding unit for coding the digital picture signal to produce the coded picture data,
  a variable length coding unit for coding in variable lengths the coded picture data to produce variable length coded picture data,
  a buffer for temporarily storing the variable length coded video picture data, and
  a buffer judgment unit for outputting a storage amount signal in accordance with an amount of the variable length coded picture data stored in said buffer.

14. A video and audio multiplex transmission system according to claim 8, wherein said video coding unit comprises:
  a video coding unit for coding the digital picture signal to produce the coded picture data,
  a variable length coding unit for coding in variable lengths the coded picture data to produce variable length coded picture data,
  a buffer for temporarily storing the variable length coded video picture data, and
  a buffer judgment unit for outputting a storage amount signal in accordance with an amount of the variable length coded picture data stored in said buffer.

15. A video and audio multiplex transmission system according to claim 6, wherein said coding control unit generates the allocation signal based on the interframe rate of change signal.

16. A video and audio multiplex transmission system according to claim 10, wherein said coding control unit generates the allocation signal based on the storage amount signal.

17. A video and audio multiplex transmission system according to claim 7, wherein said coding control unit generates the allocation signal in accordance with the interframe rate of change signal and the optimal audio bit rate signal.

18. A video and audio multiplex transmission system according to claim 11, wherein said coding control unit generates the allocation signal in accordance with the storage amount signal and the optimal audio bit rate signal.

19. A video and audio multiplex transmission system according to claim 13, wherein said coding control unit generates the allocation signal in accordance with the interframe rate of change signal, the storage amount signal, and the optimal audio bit rate signal.

20. A video and audio multiplex transmission system according to claim 14, wherein said coding control unit generates the allocation signal in accordance with the interframe rate of change signal and the storage amount signal.

21. A video and audio multiplex transmission system according to claim 1, wherein said transmission unit further comprises a delay amount calculation unit which generates delay time data based on the coded video data nd the digital sound signal and wherein said multiplexing unit multiplexes based on the delay time data.

22. A video and audio multiplex transmission system according to claim 8, wherein said coding control unit generates the allocation signal based on the interframe rate of change signal.

23. A video and audio multiplex transmission system according to claim 12, wherein said coding control unit generates the allocation signal based on the storage amount signal.

24. A video and audio multiplex transmission system according to claim 13, wherein said coding control unit generates the allocation signal in accordance with the storage amount signal and the optimal audio bit rate signal.

25. A video and audio multiplex transmission system according to claim 2, wherein said transmission unit further comprises a delay amount calculation unit which generates delay time data based on the coded video data and the digital sound signal and wherein said multiplexing unit multiplexes based on the delay time data.

26. A video and audio multiplex transmission system according to claim 3, wherein said transmission unit further comprises a delay amount calculation unit which generates delay time data based on the coded video data and the digital sound signal and wherein said multiplexing unit multiplexes based on the delay time data.

27. A video and audio multiplex transmission system according to claim 1, wherein said transmission unit further comprises a delay amount calculation unit which generates delay time data based on the coded video data and the digital sound signal and wherein said multiplexing unit multiplexes based on the delay time data.

28. A video and audio multiplex transmission system according to claim 6, wherein said transmission unit further comprises a delay amount calculation unit which generates delay time data based on the coded video data and the digital sound signal and wherein said multiplexing unit multiplexes based on the delay time data.

29. A video and audio multiplex transmission system according to claim 13, wherein said transmission unit further comprises a delay amount calculation unit which generates delay time data based on the coded video data and the digital sound signal and wherein said multiplexing unit multiplexes based on the delay time data.

30. A video and audio multiplex transmission system, wherein said system comprises:
   a transmission unit connectable to receive an audio input and a video input, comprising:
      an audio A/D converter connected to convert the audio input to a digital sound signal,
      an audio coding unit for coding the digital sound signal, for outputting coded sound data having a format that enables selection of a transmission amount and for outputting audio content data,
      a video A/D converter connected to convert the input to a digital picture signal,
      a video coding unit for coding the digital picture signal and for outputting coded picture data,
      a coding control unit for determining and outputting control data including an allocation signal indicative of a transmission ratio of the coded sound signal and the coded video data in accordance with the transmission amount of at least one of the coded sound data and the coded picture data, and
      a multiplexing unit for multiplexing the coded sound data and the coded picture data based on the allocation signal to output a multiplexed signal so as to obtain a certain transmission frame length, and
   a reception unit comprising:
      a demultiplexing unit for receiving and outputting coded sound data, coded picture data and control data including an allocation signal,
      an audio decoding unit for decoding the coded sound data to obtain a digital sound signal,
      a video decoding unit for decoding the coded picture data to obtain a digital picture signal,
      a decoding control unit for performing control of said audio decoding unit and said video decoding unit based on the allocation signal,
      an audio D/A converter connected to convert the digital sound signal to an audio output, and
      a video D/A converter for converting said picture signal to a video output, and
   wherein said audio coding unit comprises an SB-ADPCM coding unit which divides the digital sound signal into a low frequency bit portion and a high frequency bit portion for coding and selects an amount of allocation of the high frequency bit portion based on the allocation signal, and
   wherein said audio decoding unit performs SB-ADPCM decoding of said coded sound based on the allocation signal.

31. A video and audio multiplex transmission system according to claim 30,
   wherein said audio coding unit is an adaptive type which outputs a plurality of coded sounds with different coding bit rates and wherein one of the plurality of coded sound is selected based on an allocation bit rate output as the allocation signal, and
   wherein said decoding control unit performs control based on a demultiplexed allocation signal, i.e., said allocation bit rate.

32. A video and audio multiplex transmission system according to claim 31, wherein said audio coding unit outputs an optimal bit rate signal.

33. A video and audio multiplex transmission system according to claim 32, wherein said coding control unit includes the optimal bit rate signal in the allocation signal.

34. A video and audio multiplex transmission system according to claim 30, wherein said transmission unit further comprises an interframe rate of change judgment unit which finds a rate of change of interframe data of the digital picture signal, compares it with a threshold value, and outputs an interframe rate of change signal based on the comparison.

35. A video and audio multiplex transmission system according to claim 31, wherein said transmission unit further comprises an interframe rate of change judgment unit which finds a rate of change of interframe data of the digital picture signal, compares it with a threshold value, and outputs an interframe rate of change signal based on the comparison.

36. A video and audio multiplex transmission system according to claim 32, wherein said transmission unit further comprises an interframe rate of change judgment unit which finds a rate of change of interframe data of the digital picture signal, compares it with a threshold value, and outputs an interframe rate of change signal based on the comparison.

37. A video and audio multiplex transmission system according to claim 30, wherein said video coding unit comprises:
 a video coding unit for coding the digital picture signal to produce the coded picture data,
 a variable length coding unit for coding in variable lengths the coded video data to produce variable length coded picture data,
 a buffer for temporarily storing the variable length coded video data, and
 a buffer judgment unit for outputting a storage amount signal in accordance with an amount of the variable length coded picture data stored in said buffer.

38. A video and audio multiplex transmission system according to claim 31, wherein said video coding unit comprises:
 a video coding unit for coding the digital picture signal to produce the coded picture data,
 a variable length coding unit for coding in variable lengths the coded video data to produce variable length coded picture data,
 a buffer for temporarily storing the variable length coded video data, and
 a buffer judgment unit for outputting a storage amount signal in accordance with an amount of the variable length coded picture data stored in said buffer.

39. A video and audio multiplex transmission system according to claim 32, wherein said video coding unit comprises:
 a video coding unit for coding the digital picture signal to produce the coded picture data,
 a variable length coding unit for coding in variable lengths of the coded video data to produce variable length coded picture data,
 a buffer for temporarily storing the variable length coded video data, and
 a buffer judgment unit for outputting a storage amount signal in accordance with an amount of the variable length coded picture data stored in said buffer.

40. A video and audio multiplex transmission system according to claim 30, wherein said reception unit further comprises a variable delay control unit for delaying the coded sound data in accordance with delay time data.

41. A video and audio multiplex transmission system according to claim 30, wherein said transmission unit further comprises a delay amount calculation unit which generates delay time data based on the coded video data and the digital sound signal and wherein said multiplexing unit multiplexes based on the delay time data.

42. A video and audio multiplex transmission system according to claim 31, wherein said transmission unit further comprises a delay amount calculation unit which generates delay time data based on the coded video data and the digital sound signal and wherein said multiplexing unit multiplexes based on the delay time data.

43. A video and audio multiplex transmission system according to claim 30, wherein said transmission unit further comprises a delay amount calculation unit which generates delay time data based on the coded video data and the digital sound signal and wherein said multiplexing unit multiplexes based on the delay time data.

44. A video and audio multiplex transmission system having a transmission unit to receive an audio input and a video input and to transmit a multiplexed signal, comprising:
 an audio A/D converter connected to convert the audio input to a digital sound signal,
 an audio coding unit for coding the digital sound signal to output coded sound data,
 a video A/D converter connected to convert the video input to a digital picture signal,
 a video coding unit for coding the digital picture signal to output coded video data,
 a delay amount of calculation unit for calculating the variable time necessary to code the digital picture signal and output the coded video data in said video coding unit and for subtracting a fixed time necessary to code the digital sound signal and to decode the coded sound data from said variable time and output delay time data to be used for adaptively synchronizing a video reproduced signal and an audio reproduced signal in a reception unit connected to said transmission unit, and
 a multiplexing unit for multiplexing the coded video data, the coded sound data and the delay time data.

45. A video and audio multiplex transmission system wherein said system comprises:
 a transmission unit connectable to receive an audio input and a video input, comprising:
 an audio A/D converter connected to convert the audio input to a digital sound signal,
 an audio coding unit for coding the digital sound signal to output coded sound data,
 a video A/D converter connected to convert the video input to a digital picture signal,
 a video coding unit for coding the digital sound signal to output coded video data,
 a delay amount calculation unit for calculating the variable time necessary to code the digital picture signal and output the coded video data in said video coding unit and for subtracting a fixed time necessary to code the digital sound signal and to decode the coded sound data from said variable time and output delay time data to be used for adaptively synchronizing a video reproduced signal and an audio reproduced signal in a reception unit connected to said transmission unit, and a multiplexing unit for multiplexing the coded video data, the coded sound data and the delay time data, and a reception unit comprising:

a demultiplexing unit connected to receive the multiplexed signal from the transmission line and to output audio data, coded picture data, and delay time data by subtraction of a fixed time necessary to code the digital sound signal and decode the coded sound data from a variable time necessary to code the digital picture signal and output the coded video data, a variable delay control unit for delaying the audio data in accordance with the delay time data and for outputting delayed audio data, an audio decoding unit for decoding the delayed audio data to output digital sound data, an audio D/A converter connected to convert the digital sound data to an audio output, a video coding unit for decoding the coded picture data, and a video D/A converter for converting said decoded digital picture to a video output.

* * * * *

UNITED STATES PATENT AND TRADEMARK OFFICE
CERTIFICATE OF CORRECTION

PATENT NO. : 5,231,492
DATED : July 27, 1993
INVENTOR(S) : DANGI et al.

It is certified that error appears in the above-indentified patent and that said Letters Patent is hereby corrected as shown below:

Title Page [57] ABSTRACT, line 9, after "sound" insert --data--.

Col. 23, line 22, change "nd" to --and--.

Signed and Sealed this

Thirteenth Day of September, 1994

Attest:

BRUCE LEHMAN

Attesting Officer

Commissioner of Patents and Trademarks